United States Patent
Ito et al.

(10) Patent No.: US 8,127,807 B2
(45) Date of Patent: Mar. 6, 2012

(54) POUR CONNECTOR AND POUR PORT STRUCTURE OF LIQUID CONTAINER

(75) Inventors: Hiroyuki Ito, Obu (JP); Tadashi Kojima, Obu (JP); Yujirou Ishikawa, Toyota (JP); Takahiro Goto, Toyota (JP)

(73) Assignees: Tokai Kogyo Co., Ltd., Obu-shi (JP); Toyota Jidosha Kabushiki Kaisha, Toyota (JP)

( * ) Notice: Subject to any disclaimer, the term of this patent is extended or adjusted under 35 U.S.C. 154(b) by 621 days.

(21) Appl. No.: 12/226,523

(22) PCT Filed: May 31, 2007

(86) PCT No.: PCT/JP2007/061088
§ 371 (c)(1),
(2), (4) Date: Nov. 6, 2008

(87) PCT Pub. No.: WO2007/139185
PCT Pub. Date: Dec. 6, 2007

(65) Prior Publication Data
US 2009/0071570 A1 Mar. 19, 2009

(30) Foreign Application Priority Data

Jun. 1, 2006 (JP) .................. 2006-153352
Sep. 28, 2006 (JP) .................. 2006-264407

(51) Int. Cl.
*B65B 39/00* (2006.01)
*B67C 11/04* (2006.01)
(52) U.S. Cl. ...................... 141/339; 141/340
(58) Field of Classification Search ............... 141/365, 141/54, 350, 352, 340, 370, 338, 332, 339; 220/86.2
See application file for complete search history.

(56) References Cited

U.S. PATENT DOCUMENTS 4,703,867 A * 11/1987 Schoenhard ............ 220/86.2
(Continued)

FOREIGN PATENT DOCUMENTS

| DE | 199 03 545 A1 | 8/2000 |
| JP | U-63-036755 | 3/1988 |
| JP | U-63-188224 | 12/1988 |
| JP | U-64-051713 | 3/1989 |
| JP | U-01-068232 | 5/1989 |

(Continued)

OTHER PUBLICATIONS

Jun. 22, 2011 Supplementary European Search Report issued in European Application No. 07767010.7.

*Primary Examiner* — Dinh Nguyen
*Assistant Examiner* — Jennifer Gordon
(74) *Attorney, Agent, or Firm* — Oliff & Berridge, PLC

(57) ABSTRACT

A guide piece having a guide surface is integrally formed in a body portion so as to protrude from an inner circumferential wall surface of a pour passage toward the center thereof. A gas guide portion is formed in a portion of the pour passage in which the guide piece is formed. The gas guide portion is defined by a lower surface of the guide piece and the inner circumferential wall surface of the pour passage. When the pour connector is connected to the pour port of the liquid container to use the same, a projection edge of the guide piece is positioned below its base portion on the inner circumferential wall surface of the pour passage in the gravitational direction, so that the liquid poured into the pour passage can flow toward the center while it is guided by the guide surface, whereas the gas guide portion is positioned above the projection edge of the guide piece in the gravitational direction, so that gases in the container can be discharged from circumferential ends of the gas guide portion in a direction opposite to the pour direction.

16 Claims, 14 Drawing Sheets

U.S. PATENT DOCUMENTS

| | | | | |
|---|---|---|---|---|
| 5,111,858 A | * | 5/1992 | Aittama et al. | 141/312 |
| 5,860,460 A | * | 1/1999 | Hidano et al. | 141/286 |
| 6,019,127 A | * | 2/2000 | Orita et al. | 137/515.7 |
| 6,447,026 B2 | * | 9/2002 | Palvoelgyi | 285/354 |
| 6,648,033 B2 | * | 11/2003 | Gabbey et al. | 141/286 |
| 6,871,680 B2 | * | 3/2005 | Trippi, Jr. | 141/350 |
| 7,389,801 B2 | * | 6/2008 | Turker et al. | 141/352 |
| 2003/0173776 A1 | * | 9/2003 | Morohoshi et al. | 285/189 |
| 2010/0078094 A1 | * | 4/2010 | Trippi, Jr. | 141/350 |

FOREIGN PATENT DOCUMENTS

| | | |
|---|---|---|
| JP | A-07-293220 | 11/1995 |
| JP | A-08-238944 | 9/1996 |
| JP | A-10-324255 | 12/1998 |
| JP | A-10324255 A | 12/1998 |
| JP | A-2001-193555 | 7/2001 |
| JP | A-2002-339719 | 11/2002 |
| JP | U-3114418 | 8/2005 |
| JP | A-2005-306108 | 11/2005 |

\* cited by examiner

Front-Back Direction

POUR CONNECTOR AND POUR PORT STRUCTURE OF LIQUID CONTAINER

TECHNICAL FIELD

The present invention relates to a pour connector that is connected to a pour port of a liquid container, e.g., a cylinder head cover of an engine, a tank and the like so as to pour a liquid into the liquid container, and a pour port structure.

BACKGROUND ART

Generally, the cylinder head cover of an engine is provided with a pour port for pouring a lubricant (engine oil) therethrough, and this pour port is constructed to be closed by an opening/closing cover (cap) that can be detachably screwed thereinto.

Further, a pour port structure for a cylinder head cover is known (see, for example, Patent Document 1). In this structure, in order to prevent the lubricant from spattering outward via the pour port, a protector is disposed inside of the cylinder head cover at a portion positioned below the pour port. The protector is fixed to one end portion of the pour port by clamping, and a distal end portion (free end portion) thereof is provided with a guard piece arranged in a step-like pattern, which guard piece is directed in such a direction that crosses a direction of a pour passage of the lubricant.

Patent Document 1: Japanese Laid-Open Patent Publication No. 07-293220

DISCLOSURE OF THE INVENTION

Problem to be Solved by the Invention

When the lubricant is poured via the pour port of the cylinder head cover, gases (air) in the cylinder head cover is discharged via the pour port by an amount corresponding to a pour amount of the lubricant.

At this time, within the pour passage, a flow of the discharged gases is directed in a direction opposite to a pour direction of the lubricant. Further, because an area through which the discharged gases flow is identical to an area through which the lubricant is poured, a flow of the lubricant in a pour direction thereof is disturbed by the discharged gases and as a result, the lubricant cannot be poured smoothly.

In view of the above-mentioned problem, it is an object of the present invention to provide a pour connector of a liquid container in which when a liquid is poured via a pour port of a liquid container such as a cylinder head cover of an engine and a tank, the liquid can be guided and smoothly poured while the liquid is avoided from interfering with the discharged gases, and a pour port structure.

Means for Solving the Problem

In order to achieve the above-mentioned object, a pour connector of a liquid container of the present invention is directed to a pour connector that is connected to a pour port of a liquid container such as a cylinder head cover of an engine and a tank so as to pour a liquid into said liquid container, which includes a cylindrically-shaped body portion having a pour passage therein, a lower end connecting portion that is integrally formed in a lower end of said body portion and that can be connected to the pour port of said liquid container while a lower end opening of said pour passage is aligned with the pour port, and a cap fitting portion that is integrally formed in an upper end of said body portion and that can be fitted with a cap for openably closing an upper end opening of said pour passage. At least one guide piece is integrally formed in the body portion so as to be positioned between an upper end and a lower end of the pour passage formed in said body portion. The at least one guide piece protrudes from a portion of an inner circumferential wall surface of said pour passage toward the center thereof and has a guide surface formed in an upper surface thereof which surface is directed to the center of said pour passage and is downwardly inclined, so that said pour passage is partially closed by the at least one guide piece. A gas guide portion is formed in a portion of said pour passage in which said at least one guide piece is formed. The gas guide portion is defined by a lower surface of said at least one guide piece and the inner circumferential wall surface of said pour passage. When said pour connector is connected to the pour port of said liquid container to use the same, a projection edge of said at least one guide piece is positioned below its base portion on the inner circumferential wall surface of said pour passage in the gravitational direction, so that the liquid poured into said pour passage can flow toward the center while it is guided by said guide surface, whereas said gas guide portion is positioned above the projection edge of said at least one guide piece in the gravitational direction, so that gases in said container can be discharged from circumferential ends of said gas guide portion in a direction opposite to said pour direction.

According to the structure described above, in a condition in which the lower end connecting portion of the pour connector is connected to the pour port of the liquid container, when the liquid is poured into the upper end opening of the pour passage of the pour connector, almost all of the liquid flows toward the center of the pour passage while it is guided by the guide surface of the at least one guide piece and then flows down from the edge of the at least one guide piece so as to be poured into the liquid container.

Conversely, when the liquid is poured into the liquid container, the gases (air) in the liquid container are discharged from the pour passage by an amount corresponding to a pour amount of the liquid.

At this time, a flow of the discharged gases is directed in a direction opposite to a pour direction of the liquid. However, since the liquid does not enter the gas guide portion that is positioned above the edge of the at least one guide piece in the gravitational direction, the discharged gases flow from the gas guide portion through base side edges of the at least one guide piece and the circumferential wall surface without interfering with the liquid flowing down along the central portion of the pour passage, so as to be discharged to the upper end opening of the pour passage.

Thus, when the liquid is poured into the upper end opening of the pour passage of the pour connector that is connected to the pour port of the liquid container, the liquid can be guided and smoothly poured while the liquid is restrained from interfering with the discharged gases from the liquid container.

Further, in a condition in which the liquid container poured with the liquid is in use, for example, in a condition in which an engine is embodied as the liquid container and is operated while the pour connector is connected to the pour port of the cylinder head cover, when a lubricant as the liquid in a cylinder head and the cylinder head cover is spattered toward the lower end opening of the pour passage of the pour connector, the lubricant impinges against the lower side of the at least one guide piece. Therefore, the lubricant cannot be spattered upwardly in the pour passage.

Further, since the at least one guide piece is integrally formed in the circumferential wall surface of the pour passage of the pour connector, it is possible to save time consuming work of separately forming the at least one guide piece and attaching the same thereto. Also, it is not necessary to form a seat portion in the circumferential wall surface of the pour passage of the pour connector for attaching the separately formed at least one guide piece thereto.

Further, the inner circumferential wall surface of the pour passage may preferably be formed into a tapered-shape that is gradually enlarged from a boundary defined along the base portion of the at least one guide piece toward the upper end opening and toward the lower end opening. In such a structure, for example, after a cavity of an injection molding tool having upper and lower core molds corresponding to the pour passage is filled with synthetic resinous materials so as to integrally form the pour connector, the upper and lower core molds can be easily released from the pour passage of the pour connector.

Further, the at least one guide piece that protrudes from the inner circumferential wall surface of the pour passage toward the center thereof may preferably be formed such that the projecting edge does not extend beyond the center of said pour passage.

In this structure, in the portion of the pour passage in which the at least one guide piece is formed, it is possible to sufficiently make a space through which the liquid flows down along the center of the pour passage and a space through which the discharged gases flow, and to effectively prevent interference of the liquid and the discharged gases. Thus, the liquid can be further smoothly poured.

Further, the at least one guide piece may preferably include a single guide piece that protrudes from a single position of the inner circumferential wall surface of the pour passage.

In this structure, the pour passage may have an increased opening area at the portion in which the guide piece exists. As a result, the liquid can be poured in increased amounts per unit time.

Further, the at least one guide piece may preferably include two guide pieces that protrude from two positions of the inner circumferential wall surface of the pour passage which positions are spaced apart from each other in a circumferential direction thereof and are opposed to each other.

In this structure, the guide pieces are formed in both sides of the pour passage such that the liquid can be led down and guided toward the center. Therefore, it is possible to suitably avoid interference between the liquid and the discharged gases. Further, in a use condition of the liquid container in which the liquid is poured, the spattered liquid is more likely to impinge against the lower surfaces of the guide pieces. Therefore, the liquid cannot be spattered.

Further, because the guide pieces are opposed to each other, when the liquid pour connector is attached to the liquid container, it is not necessary to check directions in which the guide pieces protrude.

Further, the guide surface formed in the upper surface of the at least one guide piece may preferably be defined by a portion of an inner surface of a cone.

In this structure, the liquid poured into the pour passage can be guided and be suitably led down toward the center by the guide surface of the at least one guide piece that is defined by a portion of the inner surface of the cone.

Further, the projection edge of the at least one guide piece may preferably be shaped to a concave arc.

In this structure, the liquid poured into the pour passage can be suitably led down from the projection edge of the at least one guide piece that is shaped to the concave arc. In addition, it is possible to suitably avoid interference between the liquid and the discharged gases.

Further, attachment portions for attaching the pour connector to the liquid container may preferably be integrally formed in a plurality of portions of an outer circumference of the lower end connecting portion so as to be radially outwardly projected.

In this structure, the lower end connecting portion of the pour connector can be stably attached to the liquid container via a plurality of attachment portions.

Further, a lower surface of the lower end connecting portion may preferably be formed with an annular groove that circumferentially extends around the lower end opening of the pour passage and is shaped to receive a seal member therein.

In this structure, when the pour connector is attached to the liquid container while the seal member is fitted in the annular groove of the lower end connecting portion thereof, the lower end connecting portion of the pour connector can be sealed with respect to the liquid container, the liquid cannot be leaked from a space between the lower end connecting portion of the pour connector and the liquid container.

Further, a lower surface of the lower end connecting portion may preferably be perpendicular to a center line of the pour passage.

This structure is suitable for a case in which the pour port of the liquid container is opened upwardly. That is, when the pour port of the liquid container is opened upwardly, the pour connector can be perpendicularly attached thereto, so that the upper end opening of the pour passage can be directed upwardly. Therefore, the liquid can be easily poured.

Further, a lower surface of the lower end connecting portion may preferably be inclined with respect to a center line of the pour passage so as to not be perpendicular thereto.

This structure is suitable for a case in which the pour port on the liquid container is upwardly obliquely opened. That is, when the pour port of the liquid container is upwardly obliquely opened, the pour connector can be attached thereto while the lower end connecting portion thereof is inclined, so that the upper end opening of the pour passage can be directed upwardly. Therefore, the liquid can be easily poured.

Further, at least one recess may preferably be formed in an outer circumferential side surface of the lower end connecting portion.

In this structure, formation of shrinking during resin molding can be prevented by the at least one recess of the outer circumferential side surface of the lower end connecting portion, thereby preventing distortion of the lower end connecting portion caused by the shrinking during the resin molding.

Further, a bottomed-cylindrical shaped proximal end guide member having an inner space communicated with the lower end opening of the pour passage may preferably be provided to an inner circumference of a lower end portion of the lower end connecting portion. Also, a circumferential wall portion of the proximal end guide member may preferably be formed with an open hole through which the inner space is communicated with an interior of the liquid container.

In this structure, in a condition in which the pour connector is connected to the pour port of the liquid container via the lower end connecting portion, when the liquid is poured into the upper end opening of the pour passage of the pour connector, almost all of the liquid flows toward the center of the pour passage while it is guided by the guide surface of the at least one guide piece. Thereafter, the liquid flows down from the edge of the at least one guide piece. Thereafter, the liquid flows through the lower end opening of the pour passage into the inner space of the proximal end guide member, and is then poured into the liquid container via the open hole of the proximal end guide member.

Conversely, when the liquid is poured into the liquid container, the gases (air) in the liquid container are introduced into the inner space via the open hole of the proximal end guide member by an amount corresponding to a pour amount of the liquid, and are then discharged from the pour passage.

In addition, in a condition in which the liquid container poured with the liquid is in use, for example, in a condition in which an engine is embodied as the liquid container and is operated while the pour connector is connected to the pour port of the cylinder head cover, when a lubricant as the liquid in a cylinder head and the cylinder head cover is spattered toward the pour connector, the spattered lubricant impinges against a lower surface of the bottom wall portion and an outer circumferential surface of the circumferential wall portion of the proximal end guide member, so as to be dropped. As a result, the spattered lubricant can be prevented from entering the pour passage via the inner space of the proximal end guide member.

Even if a portion of the spattered lubricant is spattered toward the lower end opening of the pour passage via the inner space of the proximal end guide member through the open hole thereof, the spattered lubricant impinges against the lower side of the at least one guide piece in the pour passage, so as to be prevented from being spattered upwardly in the pour passage.

That is, due to the proximal end guide member disposed at the lower end opening of the pour passage and the at least one guide piece in the pour passage, the lubricant can be doubly prevented from spattering.

Further, an annular recess may preferably be formed in an inner circumference of a lower end portion of the lower end connecting portion. Also, a flange that is integrally bonded to a bottom surface of said annular recess may preferably be formed in an outer circumference of an upper end portion of the proximal end guide member. In this structure, the flange formed in the outer circumference of the upper end portion of the proximal end guide member can be stably secured to the bottom surface of the annular recess of the lower end connecting portion via adhesives or fusion-bonding.

For example, if a connector main body and the proximal end guide member are respectively formed from compatible thermoplastic synthetic resinous materials, the flange formed in the outer circumference of the upper end portion of the proximal end guide member can be reliably and firmly bonded and connected to the bottom surface of the annular recess of the lower end connecting portion via adhesives, high-frequency fusion-bonding, ultrasonic fusion-bonding or other such means.

A pour port structure of a cylinder head cover of the present invention is directed to a pour port structure for pouring a lubricant into a cylinder head cover of an engine, which includes a cylindrically-shaped body portion integrally formed in an upper portion of the cylinder head cover and having a pour passage therein, and a cap fitting portion that is integrally formed in an upper end of said body portion and that can be fitted with a cap for openably closing an upper end opening of said pour passage. At least one guide piece is integrally formed in the body portion so as to be positioned between an upper end and a lower end of the pour passage of said body portion. The at least one guide piece protrudes from a portion of an inner circumferential wall surface of said pour passage toward the center thereof and has a guide surface formed in an upper surface thereof which surface is directed to the center of said pour passage and is downwardly inclined, so that said pour passage is partially closed by the at least one guide piece. A gas guide portion is formed in a portion of said pour passage in which said at least one guide piece is formed.

The gas guide portion is defined by a lower surface of said at least one guide piece and the inner circumferential wall surface of said pour passage. A projection edge of said at least one guide piece is positioned below its base portion on the inner circumferential wall surface of said pour passage in the gravitational direction, so that the lubricant poured into said pour passage can flow toward the center while it is guided by said guide surface, whereas said gas guide portion is positioned above the projection edge of said at least one guide piece in the gravitational direction, so that gases in said cylinder head cover can be discharged from circumferential ends of said gas guide portion in a direction opposite to said pour direction.

According to the structure described above, when the lubricant is poured into the upper end opening of the pour passage, almost all of the lubricant flows toward the center of the pour passage while it is guided by the guide surface of the at least one guide piece and then flows down from the edge of the at least one guide piece so as to be poured into the cylinder head cover.

When the lubricant is poured into the cylinder head cover, the gases (air) in the cylinder head cover are discharged from the pour passage by an amount corresponding to a pour amount of the lubricant.

At this time, a flow of the discharged gases is directed in a direction opposite to a pour direction of the lubricant. However, since the lubricant does not enter the gas guide portion that is positioned above the edge of the at least one guide piece in the gravitational direction, the discharged gases flow from the gas guide portion through base side edges of the at least one guide piece and the circumferential wall surface without interfering with the lubricant flowing down along the central portion of the pour passage, so as to be discharged to the upper end opening of the pour passage.

Thus, the lubricant can be guided and smoothly poured while the lubricant is restrained from interfering with the discharged gases from the cylinder head cover.

Further, when the lubricant in the cylinder head cover is spattered toward the lower end opening of the pour passage, the lubricant impinges against the lower side of the at least one guide piece, so as to be prevented from being spattered upwardly in the pour passage.

Further, the substantially cylindrically-shaped body portion having the pour passage, the at least one guide piece and the gas guide portion are integrally formed in the upper portion of the cylinder head cover. As a result, the number of components and the number of fabrication processes can be reduced.

Figure 1:
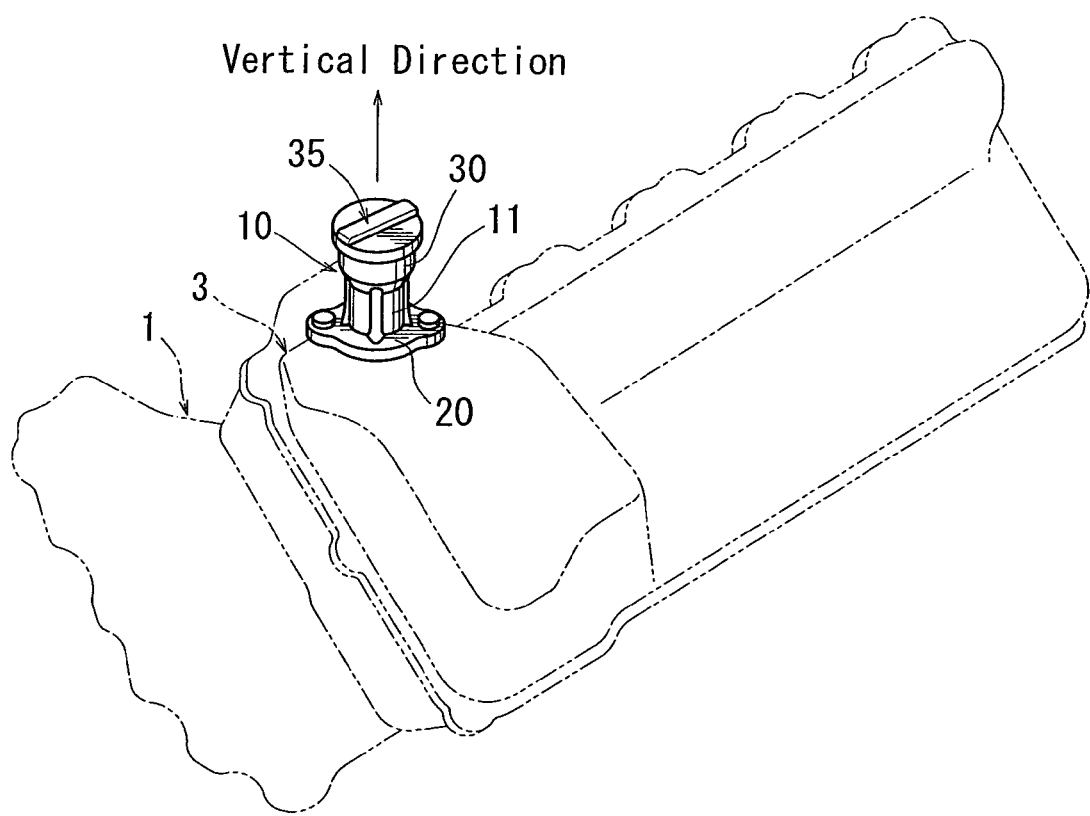
FIG. 1 is a schematic perspective view of a pour connector according to a first embodiment of the present invention, which illustrates a condition in which it is connected to a pour port of a cylinder head cover of an engine.

DESCRIPTION OF REFERENCE NUMERALS 3, 103 cylinder head cover (container)
5, 105 pour port
10, 110, 210, 310 pour connector
11, 111 body portion
20, 120 lower end connecting portion
21, 121 attachment portion
24, 124 annular groove
28 attachment bolt
29 annular recess
29a bottom surface
30, 130 cap fitting portion
35, 135 cap
40, 140 pour passage
40a, 140a inlet port
40b, 140b outlet port
50, 150 guide piece
51, 151 guide surface
53, 153 projection edge
55, 155 inner circumferential wall surface
56, 156 gas guide portion
60 proximal end guide member
61 circumferential wall portion
62 bottom wall portion
63 open hole
65 flange

BEST MODE FOR CARRYING OUT THE INVENTION

Next, the best mode for carrying out the present invention will be described based upon embodiments.
First Embodiment A first embodiment of the present invention will be described with reference to FIGS. 1 to 6.

Figure 2:
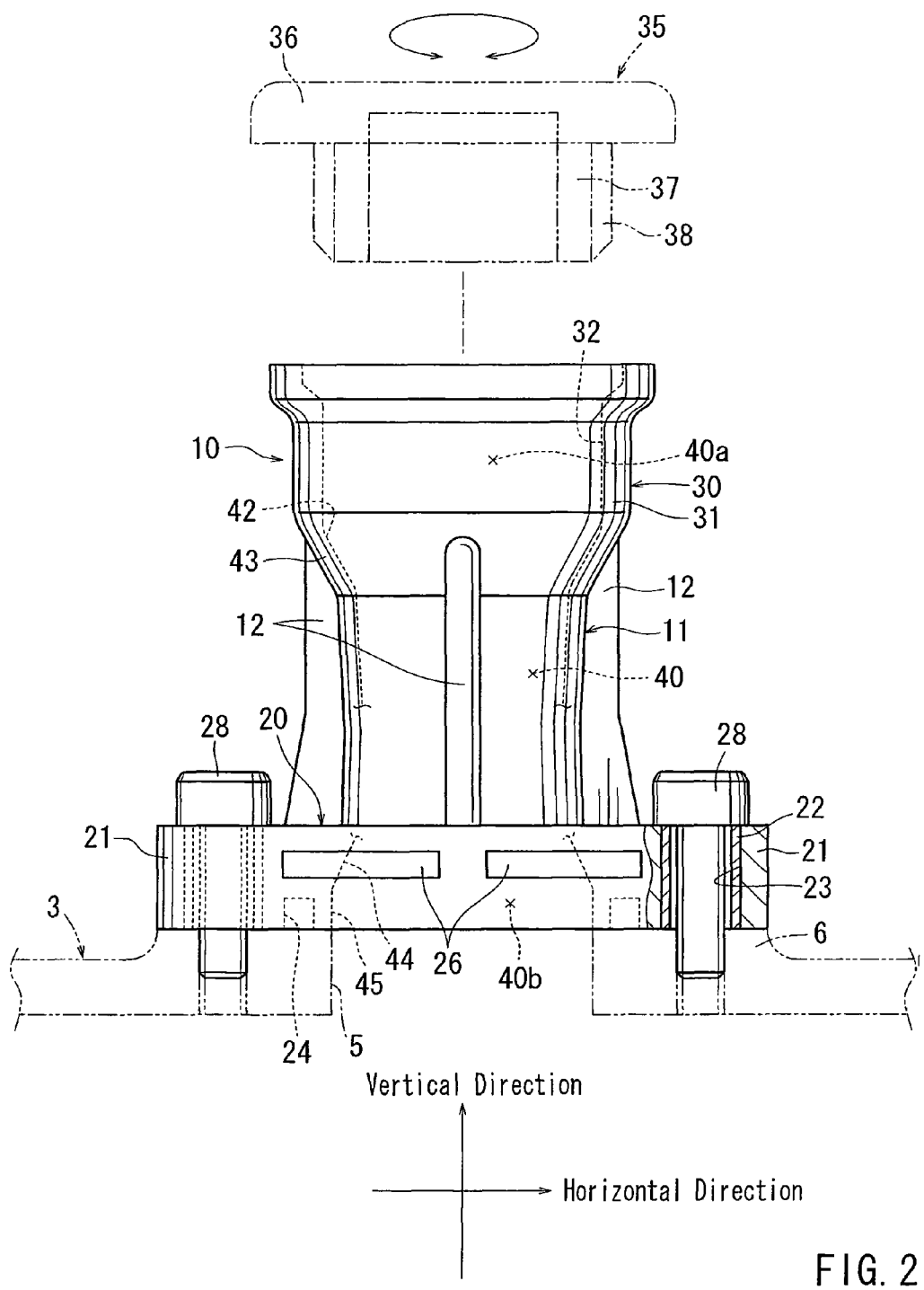
FIG. 2 is a front view of the pour connector in which a attachment portion thereof is partially cutaway.
Figure 3:
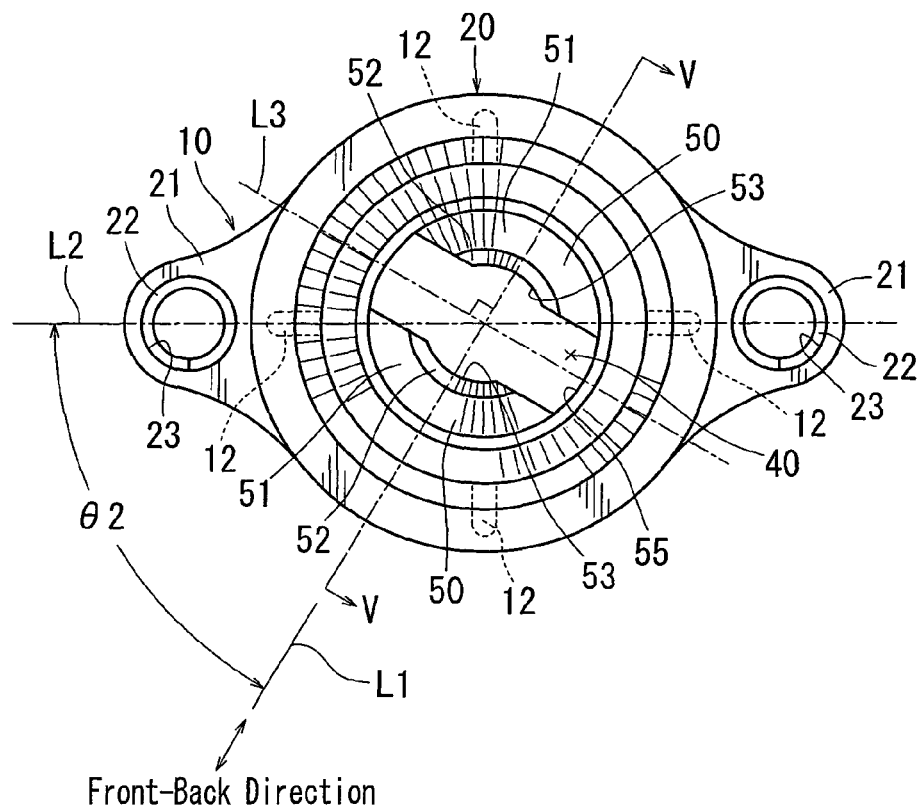
FIG. 3 is an overhead plan view of the pour connector.
Figure 4:
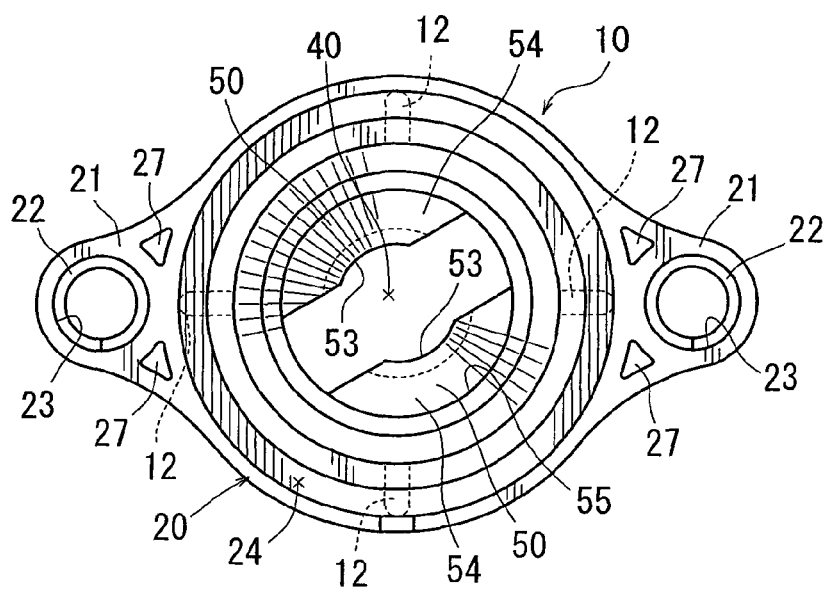
FIG. 4 is a bottom plan view of the pour connector.
Figure 5:
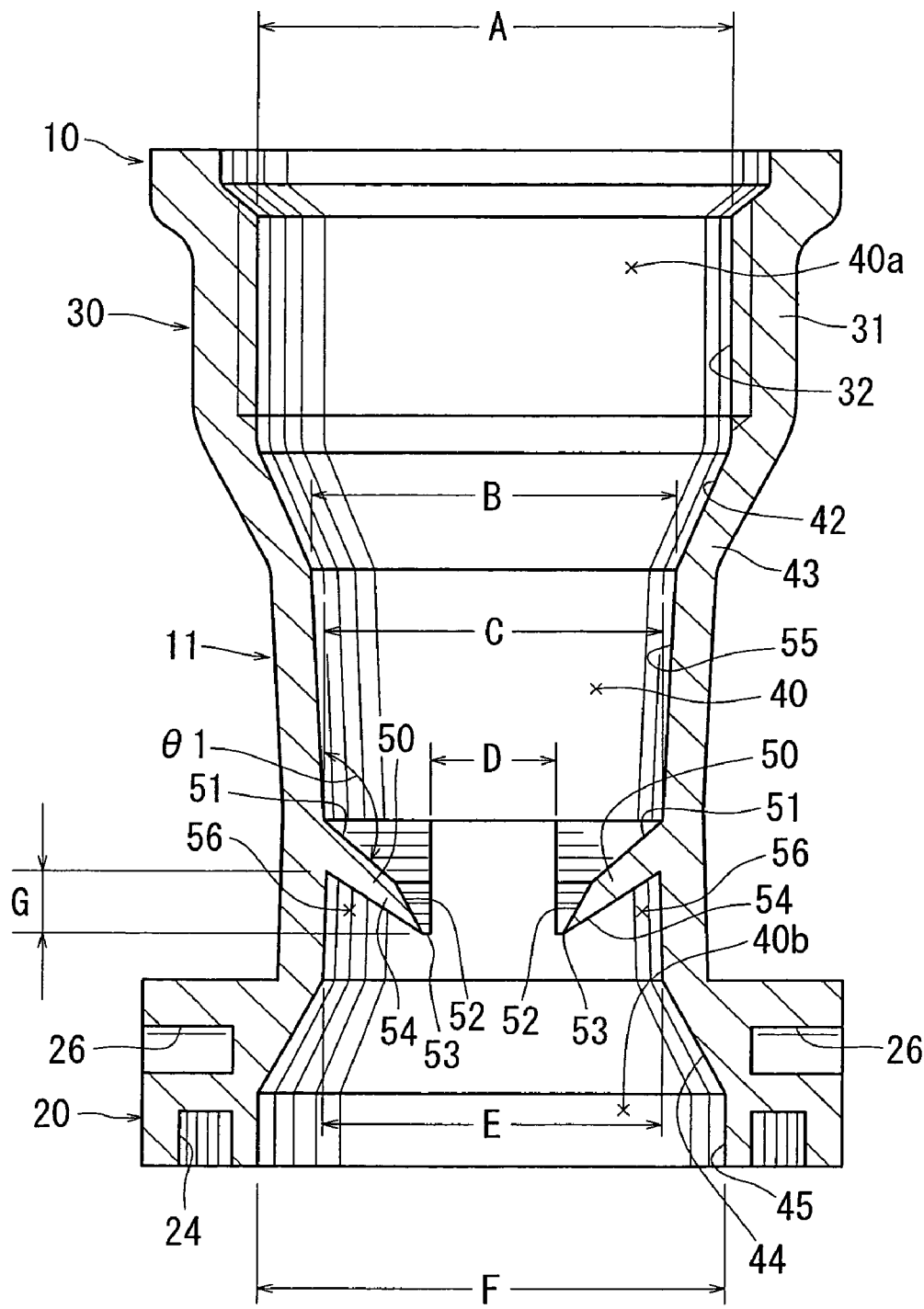
FIG. 5 is a vertical sectional view of the pour connector taken along line V-V of FIG. 3.
Figure 6:
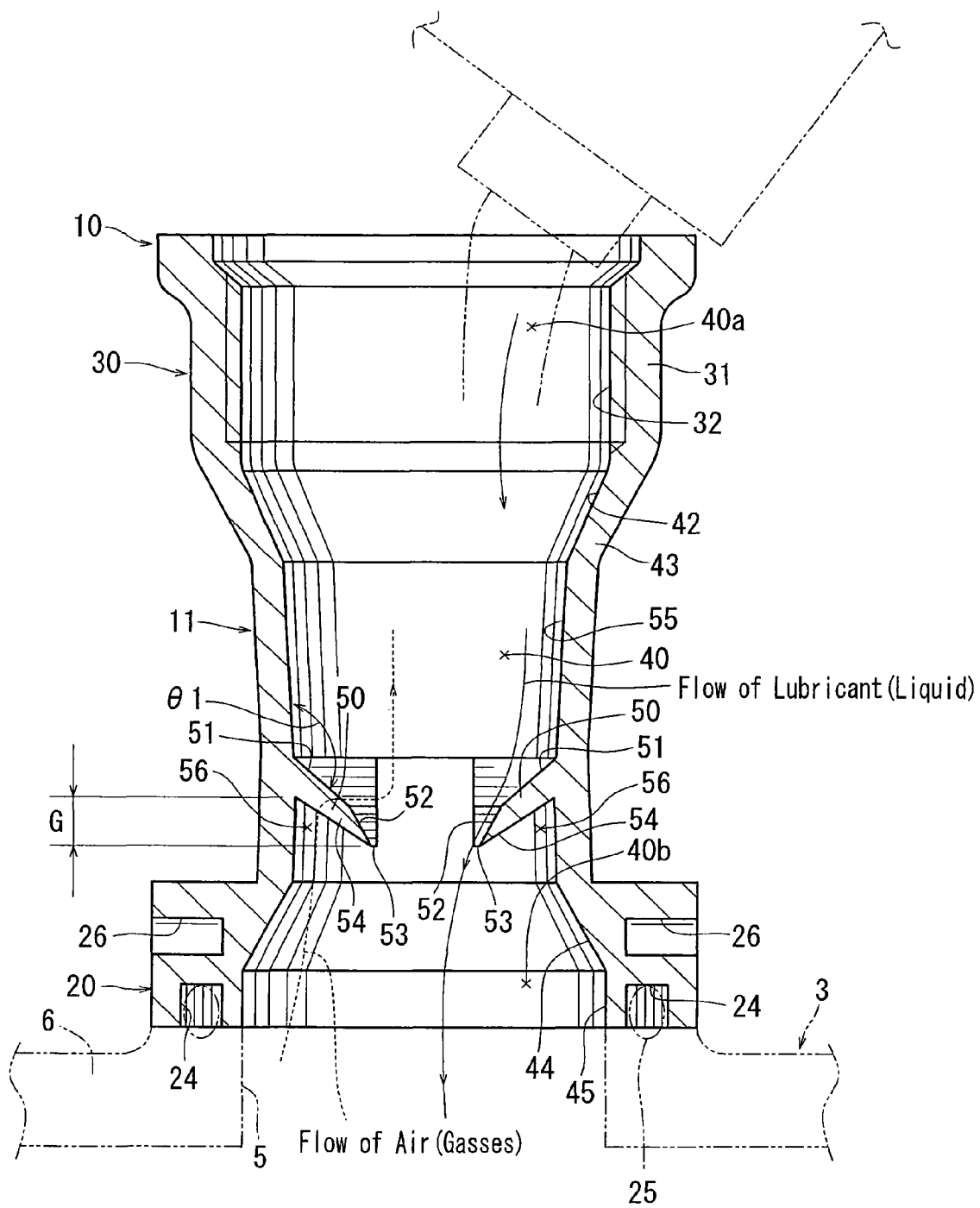
FIG. 6 is an explanatory view, which illustrates flows of a lubricant poured into a pour passage of the pour connector and discharged gases.

FIG. 1 is a schematic perspective view of a pour connector according to the first embodiment of the present invention, which illustrates a condition in which it is connected to a pour port of a cylinder head cover of an engine. FIG. 2 is a front view of the pour connector in which a attachment portion thereof is partially cutaway. FIG. 3 is an overhead plan view of the pour connector. FIG. 4 is a bottom plan view of the pour connector. FIG. 5 is a vertical sectional view of the pour connector taken along line V-V of FIG. 3. FIG. 6 is an explanatory view, which illustrates flows of a lubricant poured into a pour passage of the pour connector and discharged gases.

As shown in FIGS. 1 and 2, in the first embodiment, exemplified is a pour connector that is connected to a pour port 5 of a cylinder head cover 3 of an engine 1 as a pour port of a liquid container. The pour connector 10 is integrally formed as a unit by injection molding of synthetic resinous materials.

As shown in FIGS. 2 to 5, the pour connector 10 is composed of a substantially cylindrically-shaped body portion 11 having a pour passage 40 therein, a lower end connecting portion 20 that is integrally formed in a lower end of the body portion 11 and that can be connected to the pour port of the liquid container while a lower end opening of the pour passage 40 is aligned with the pour port, and a cap fitting portion 30 that is integrally formed in an upper end of the body portion 11 and that can be fitted with a cap 35 for openably closing an upper end opening of the pour passage 40.

That is, in the first embodiment, as shown in FIG. 5, the lower end connecting portion 20 is formed with a lower tapered hole portion 44 and a lower end hole portion 45 that respectively constitute an outlet port 40b of the pour passage 40 of the body portion 11. Further, the lower tapered hole portion 44 is communicated with a lower end portion of the pour passage 40 at an upper end thereof and has a tapered-shape that is gradually enlarged toward a lower end thereof. Also, the lower end hole portion 45 is communicated with the lower end of the lower tapered hole portion 44.

As shown in FIG. 5, formed in the cap fitting portion 30 is a cap receiving portion 31 that constitutes an inlet port 40a of the pour passage 40 of the body portion 11. Female threads 32 are formed in an inner circumferential wall surface of the cap receiving portion 31, so that male threads 38 formed in an outer circumferential surface of an insertion portion 37 of the cap 35 can be screwed therein. As shown by chain double-dashed lines in FIG. 2, the cap 35 has an enlarged diameter cap plate portion 36 and an reduced diameter insertion portion 37 that integrally protrudes from the center of a lower surface of the cap plate portion 36. The male threads 38 are formed in the outer circumferential surface of the insertion portion 37.

As shown in FIG. 5, formed between the cap fitting portion 30 and the body portion 11 is an upper tapered cylinder portion 43 having an upper tapered hole portion 42. The upper tapered portion 42 is communicated with the cap receiving portion 31 at an upper end thereof and is gradually reduced toward a lower end thereof and is communicated with the pour passage 40 at the lower end.

Further, the pour passage 40 having the inlet port 40a positioned at its upper portion and the outlet port 40b positioned at its lower portion is perpendicularly oriented and has a center line that is formed by a straight line (vertical line).

As shown in FIGS. 3 to 5, guide pieces 50 are integrally formed in the body portion 11 so as to be positioned between an upper end and a lower end of the pour passage 40 of the body portion 11. The guide pieces 50 protrude from a portion of an inner circumferential wall surface 55 of the pour passage 40 toward the center thereof and have guide surfaces 51 formed in upper surfaces thereof each of which surfaces is directed to the center of the pour passage 40 and is downwardly inclined, so that the pour passage 40 is partially closed by the guide pieces 50.

Further, the guide pieces 50 that protrude from the inner circumferential wall surface 55 of the pour passage 40 toward the center thereof may preferably be formed such that their projecting edges 53 do not extend beyond the center of the pour passage 40.

In the first embodiment, the guide pieces 50 protrude from two positions of the inner circumferential wall surface 55 of the pour passage 40 which positions are spaced apart from each other in a circumferential direction thereof and are opposed to each other, and are paired with each other. Further, the guide surfaces 51 formed in the upper surfaces of a pair of guide pieces 50 are defined by a portion of an inner surface of a common cone.

In the first embodiment, as shown in FIG. 5, an inclination angle θ1 of the guide surfaces 51 of the guide pieces 50 with respect to the vertical line may preferably be determined at approximately 120 degrees.

Further, formed between portions closer to the projecting edges of the guide surfaces 51 of the guide pieces 50 and the projecting edges 53 are drop guide surfaces 52 that are sharply inclined than the guide surfaces 51. As shown in FIG. 3, each of the projection edges 53 of the drop guide surfaces 52 is shaped to a concave arc (an arc centered at the center of the pour passage 40) in a plan view.

Further, as shown in FIG. 5, gas guide portions 56 are formed in portions of the pour passage 40 in which the guide pieces 50 are formed. These gas guide portions 56 are defined by lower surfaces 54 of the guide pieces 50 and the inner circumferential wall surface 55 of the pour passage 40.

Further, as shown in FIG. 6, when the pour connector 10 is connected to the pour port 5 of the cylinder head cover 3 to use the same, the projection edges 53 of the guide pieces 50 are positioned below their base portions adjacent to the inner circumferential wall surface 55 of the pour passage 40 by a distance corresponding to a dimension G in the gravitational direction, so that the lubricant (engine oil) poured into the pour passage 40 can flow toward the center while it is guided by the guide surfaces 51. Conversely, the gas guide portions 56 are positioned above the projection edges 53 of the guide pieces 50 in the gravitational direction, so that gases in the cylinder head cover 3 can be discharged from circumferential ends of the gas guide portions 56 upwardly, i.e., in a direction opposite to a pour direction of the lubricant.

Further, in the first embodiment, the inner circumferential wall surface 55 of the pour passage 40 is formed into a tapered-shape that is gradually enlarged from a boundary defined along the base portions of the guide pieces 50 toward the upper end opening (an upper end opening of the inlet port 40*a*) and toward the lower end opening (a lower end opening of the outlet port 40*b*).

That is, as shown in FIG. 5, an inner diameter dimension of the cap receiving portion 31 is referred to as a dimension A. An inner diameter dimension of the upper end of the body portion 11 is referred to as a dimension B. An inner diameter dimension of a portion of the body portion 11 corresponding to the base portions of the guide pieces 50 is referred to as a dimension C. A distance dimension between the projection edges 53 of the guide pieces 50 is referred to as a dimension D. An inner diameter dimension of the lower end of the body portion 11 is referred to as a dimension E. An inner diameter dimension of the lower end hole portion 45 of the lower end connecting portion 20 is referred to as a dimension F. These dimensions are determined so as to have a following relation:

$$A > B > C > D, \text{ and } F > E.$$

Further, as shown in FIGS. 2 to 4, attachment portions 21 for attaching the pour connector 10 to the cylinder head cover 3 are integrally formed in a plurality of portions (in FIG. 3, two positions spaced at 180 degrees) of an outer circumference of the lower end connecting portion 20 so as to be radially outwardly projected.

Through-holes 23 are formed in the respective attachment portions 21. Also, closely fitted in the through-holes 23 are metal collars 22 each having a through bore into which male threads of a attachment bolt 28 is inserted, so that excessive stress cannot be generated in the attachment portions 21.

Further, in the first embodiment, as shown in FIG. 3, a line L2 connecting the centers of the through-holes 23 is determined so as to be positioned at an angle of θ2 with respect to a line L1 that is parallel to a front-back direction of a vehicle and passes through the center of the pour passage 40. Also, the two guide pieces 50 are symmetrically formed with respect to a line L3 that is orthogonal to the line L1 and passes through the center of the pour passage 40.

Further, in the first embodiment, as shown in FIGS. 2 to 4, formed in outer circumferential surfaces of the upper tapered cylinder portion 43 and the body portion 11 are a plurality of reinforcing ribs 12 that are circumferentially spaced at predetermined intervals and vertically extend from the upper tapered cylinder portion 43 to the lower end of the body portion 11, so that the body portion 11 is strengthened.

Further, as shown in FIGS. 4 and 5, recesses 26 and 27 are formed in an outer circumferential side surface and a lower surface of the lower end connecting portion 20 in order to prevent formation of deforming and shrinking due to uneven thickness during resin molding. Also, the recesses 26 and 27 may preferably maintain flatness of the lower surface of the lower end connecting portion 20.

Further, as shown in FIG. 6, the lower surface of the lower end connecting portion 20 is formed with an annular groove 24. This annular groove 24 circumferentially extends around the lower end opening of the pour passage 40 and is shaped to receive a seal member 25 (for example, an O-ring formed from elastic materials) therein.

The pour connector 10 of the first embodiment is constructed as described above.

Therefore, as shown in FIGS. 1 and 2, the lower end connecting portion 20 of the pour connector 10 is disposed on a seat portion 6 that is formed around the pour port 5 of the cylinder head cover 3, and the through bores of the metal collars 22 of the attachment portions 21 of the lower end connecting portion 20 are aligned with female threads formed in the seat portion 6. Thereafter, the attachment bolts 28 are screwed into the female threads of the seat portion 6 through the collars 22 of the attachment portions 21, so that the outlet port 40*b* of the pour passage 40 of the pour connector 10 is aligned with the pour port 5 of the cylinder head cover 3 and is connected thereto.

As described above, in a condition in which the pour connector 10 is connected to the pour port 5 of the cylinder head cover 3, as shown in FIG. 6, the cap 35 is removed from the cap receiving portion 31 of the pour connector 10. Thereafter, the lubricant is poured into the upper end opening of the inlet port 40*a* of the pour passage 40.

Thus, almost all of the lubricant flows toward the center of the pour passage 40 while it is guided by the guide surfaces 51 formed in the upper surfaces of the guide pieces 50. Thereafter, the lubricant flows down from the projection edges 53 of the drop guide surfaces 52 and is then poured into the engine 1 through the cylinder head cover 3 so as to be stored in an oil pan positioned at a lower portion of the engine 1.

Conversely, when the lubricant is poured into the cylinder head cover 3, the gases (air) in the cylinder head cover 3 are discharged from the inlet port 40*a* of the pour passage 40 by an amount corresponding to a pour amount of the lubricant.

At this time, a flow of the discharged gases is directed in a direction opposite to a pour direction of the lubricant. However, since the lubricant does not enter the gas guide portions 56 that are positioned above the projection edges 53 of the guide pieces 50 in the gravitational direction, the discharged gases flow from the gas guide portions 56 through base side edges of the guide pieces 50 and the inner circumferential wall surface 55 of the pour passage 40 without interfering with the lubricant flowing down along the central portion of the pour passage 40, so as to be discharged to the exterior via the inlet port 40a of the pour passage 40.

As described above, when the lubricant is poured into the upper end opening of the inlet port 40a of the pour passage 40 of the pour connector 10, the lubricant can be guided and smoothly poured while the lubricant is restrained from interfering with the discharged gases from the cylinder head cover 3.

Further, in a condition in which the engine 1 poured with the lubricant is operated, when the lubricant in the engine 1 (including the cylinder head cover 3) is spattered toward the outlet port 40b of the pour passage 40 of the pour connector 10, the lubricant impinges against the lower surfaces 54 of the guide pieces 50. Therefore, the lubricant cannot be spattered upwardly in the pour passage 40.

Further, since the guide pieces 50 are integrally formed in the inner circumferential wall surface 55 of the pour passage 40 of the pour connector 10, it is possible to save time consuming work of separately forming the guide pieces 50 and attaching the same thereto. Also, it is not necessary to form seat portions (attachment portions) in the pour connector 10 for attaching the separately formed guide pieces 50 thereto.

Further, in the first embodiment, the inner circumferential wall surface 55 of the pour passage 40 is formed into a tapered-shape that is gradually enlarged from the boundary defined along the base portions of the guide pieces 50 toward the upper end opening of the inlet port 40a and toward the lower end opening of the outlet port 40b.

That is, as shown in FIG. 5, the respective dimensions are determined so as to have the relation "A>B>C>D, and F>E." Therefore, for example, after a cavity of an injection molding tool having upper and lower core molds corresponding to the pour passage 40 is filled with the synthetic resinous materials so as to integrally form the pour connector 10, the upper and lower core molds can be easily released from the pour passage 40 of the pour connector 10.

Further, in the first embodiment, the guide pieces 50 that protrude from the inner circumferential wall surface 55 of the pour passage 40 toward the center thereof are formed such that their projecting edges 53 do not extend beyond the center of said pour passage 40. Therefore, in the portion of the pour passage 40 in which the guide pieces 50 are formed, it is possible to sufficiently make a space through which the lubricant flows down along the center of the pour passage 40 and a space through which the discharged gases flow, and to effectively prevent interference of the lubricant and the discharged gases. Thus, the lubricant can be further smoothly poured.

Further, in the first embodiment, the guide pieces 50 protrude from the two positions which are spaced apart from each other in a circumferential direction of the inner circumferential wall surface 55 of the pour passage 40 and are opposed to each other, so that the lubricant can be led down and guided from the inner circumferential wall surface 55 of the pour passage 40 toward the center by both of the guide pieces 50. Therefore, it is possible to suitably avoid interference between the lubricant and the discharged gases. Further, in a use condition, for example, in a condition in which the vehicle is moved, the spattered lubricant is more likely to impinge against the lower surfaces 54 of the guide pieces 50. This may have an increased effects on spattering prevention of the lubricant.

Further, because the guide pieces 50 are opposed to each other, when the pour connector 10 is attached to the pour port 5 of the cylinder head cover 3, it can be attached thereto without checking directions in which the guide pieces 50 protrude.

Further, in the first embodiment, because the guide surfaces 51 formed in the upper surfaces of the guide pieces 50 are defined by a portion of the inner surface of the cone, the lubricant poured into the pour passage 40 can be guided and suitably led down toward the center by the guide surfaces 51 of the guide pieces 50 that are defined by a portion of the inner surface of the cone.

Further, in the first embodiment, as shown in FIG. 3, the projection edges 53 of the guide pieces 50 are shaped to the concave arc in plan view. Therefore, the lubricant poured into the pour passage 40 can be suitably led down from the projection edges 53 of the guide pieces 50 that are shaped to the concave arc. In addition, it is possible to suitably avoid interference between the lubricant and the discharged gases.

Further, in the first embodiment, the attachment portions 21 for attaching the pour port 5 of the cylinder head cover 3 are integrally formed in a plurality of portions of the outer circumference of the lower end connecting portion 20 so as to be radially outwardly projected. Therefore, the lower end connecting portion 20 of the pour connector 10 can be stably attached to the cylinder head cover 3 via a plurality of attachment portions 21.

Further, in the first embodiment, as shown in FIG. 6, the lower surface of the lower end connecting portion 20 is formed with the annular groove 24. This annular groove 24 circumferentially extends around the lower end opening of the pour passage 40 and is shaped to receive the seal member 25 therein. Therefore, when the pour connector 10 is attached to the cylinder head cover 3 while the seal member 25 is fitted in the annular groove 24 of the lower end connecting portion 20 thereof, the lower end connecting portion 20 of the pour connector 10 can be sealed with respect to the cylinder head cover 3, thereby preventing the lubricant from leaking from a space between the lower end connecting portion 20 of the pour connector 10 and the cylinder head cover 3.

Further, in the first embodiment, because the pour passage 40 is formed so as to have a center line that is formed by a straight line, it is suitable for a case in which the pour port 5 of the cylinder head cover 3 is opened upwardly. That is, when the pour port 5 of the cylinder head cover 3 is opened upwardly, the pour connector 10 can be perpendicularly attached thereto, so that the upper end opening of the inlet port 40a of the pour passage 40 can be directed upwardly. Therefore, the lubricant can be easily poured.

Further, in the first embodiment, as shown in FIGS. 4 and 5, because the recesses 26 are formed in the outer circumferential side surface and the lower surface of the lower end connecting portion 20, the formation of the shrinking during the resin molding can be prevented by the recesses 26 of the outer circumferential side surface of the lower end connecting portion 20, thereby preventing distortion of the lower end connecting portion 20 caused by the shrinking during the resin molding.

Second Embodiment

Next, a pour connector according to a second embodiment of the present invention will be described with reference to FIGS. 7 to 11.

Figure 7:
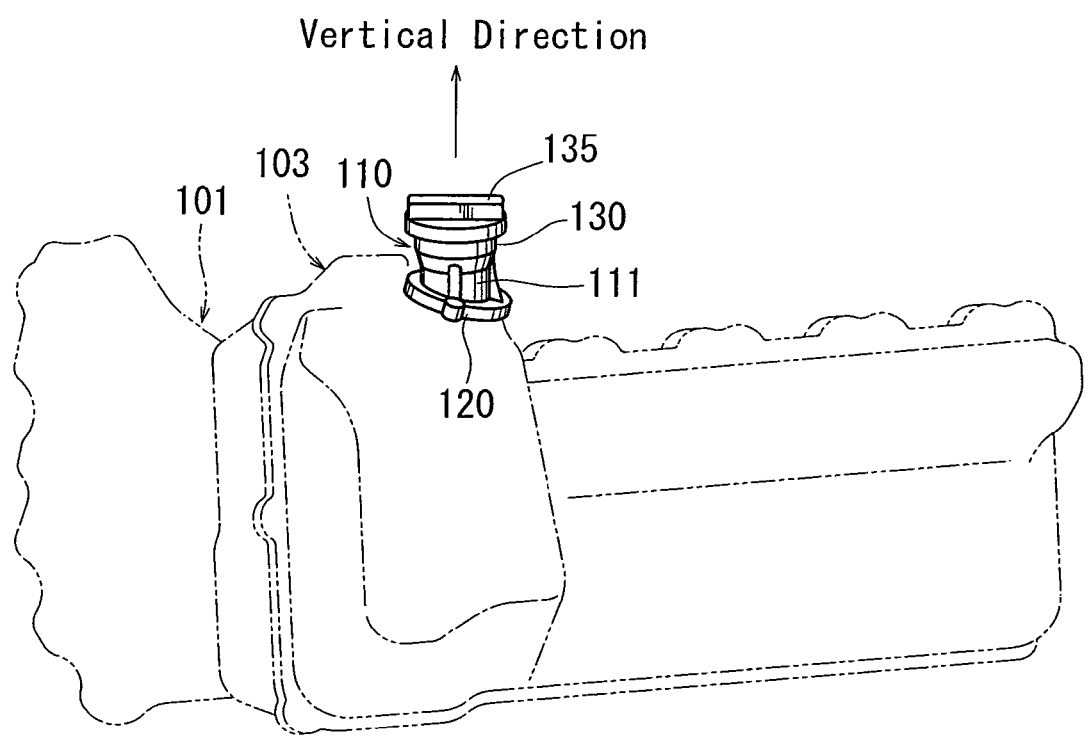
FIG. 7 is a schematic perspective view of a pour connector according to a second embodiment of the present invention, which illustrates a condition in which it is connected to a pour port of a cylinder head cover of an engine.
Figure 8:
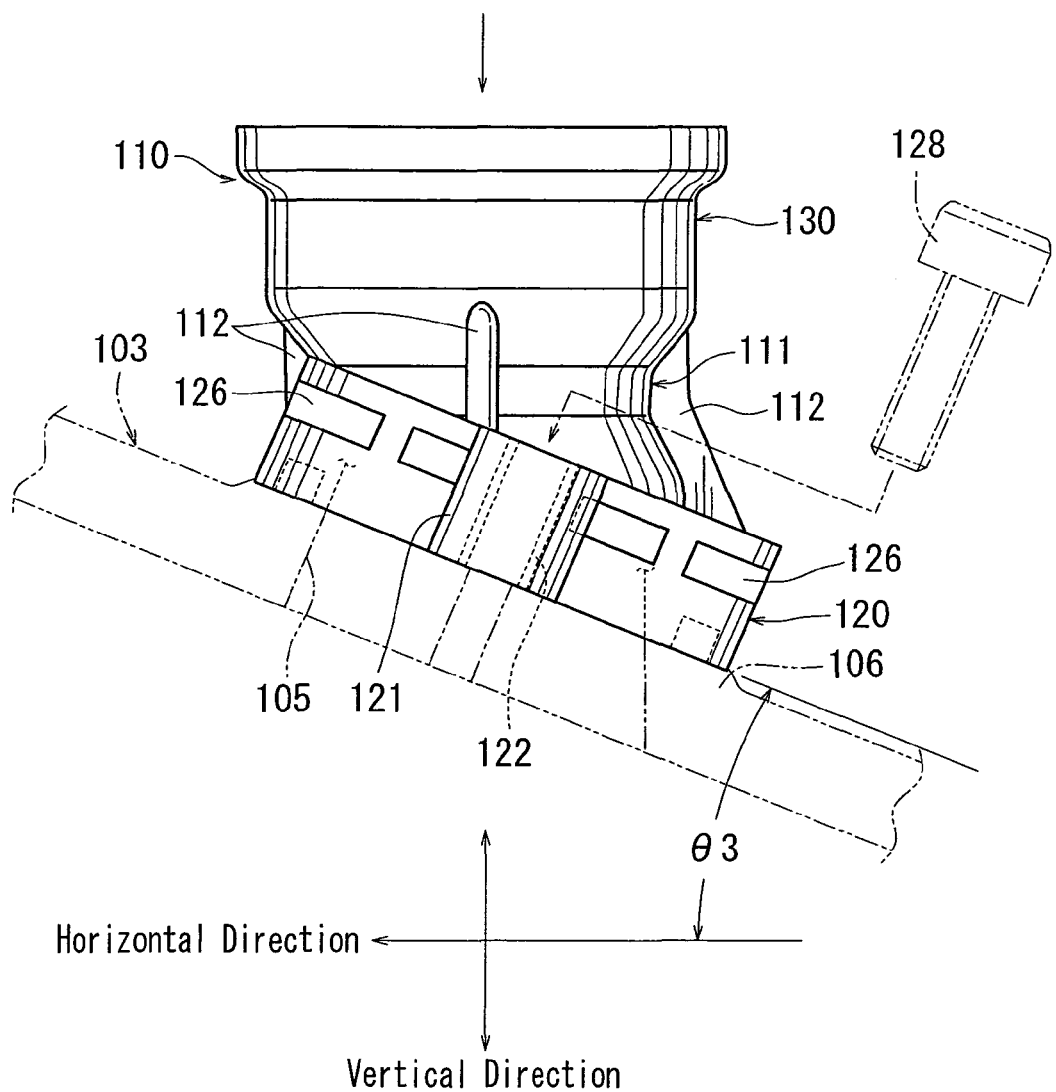
FIG. 8 is a front view of the pour connector.
Figure 9:
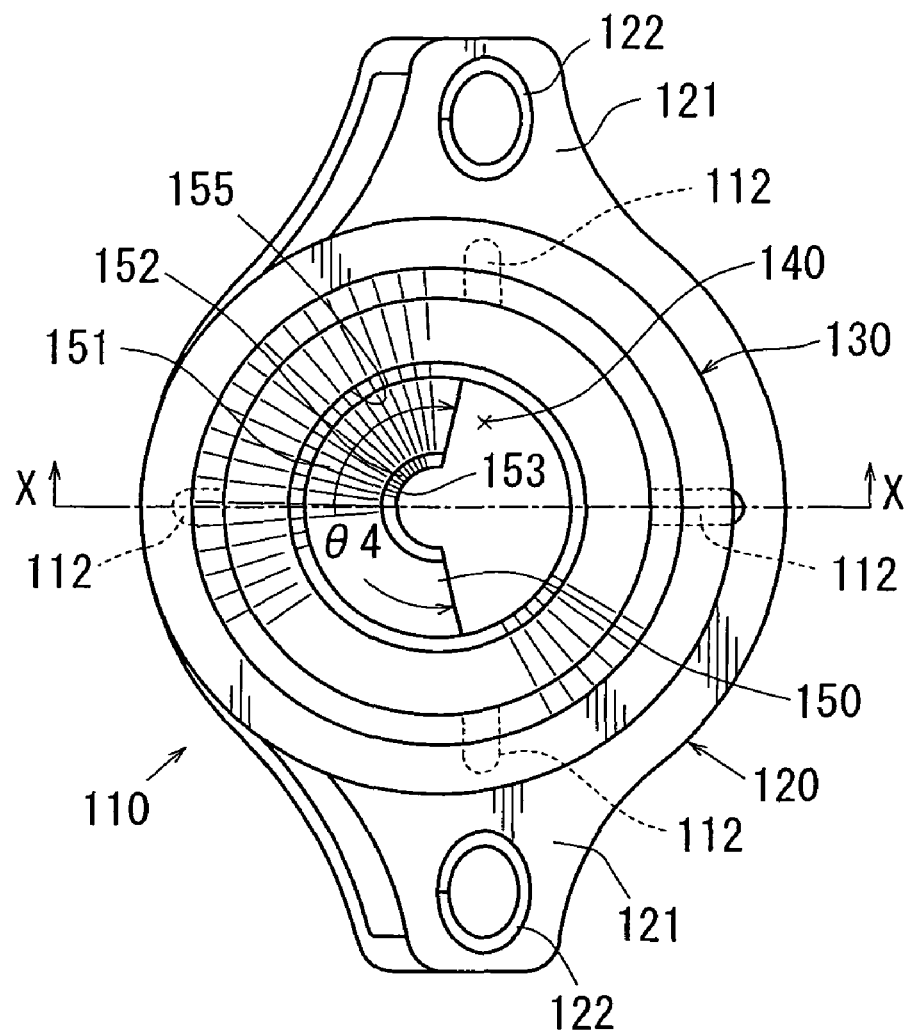
FIG. 9 is an overhead plan view of the pour connector.
Figure 10:
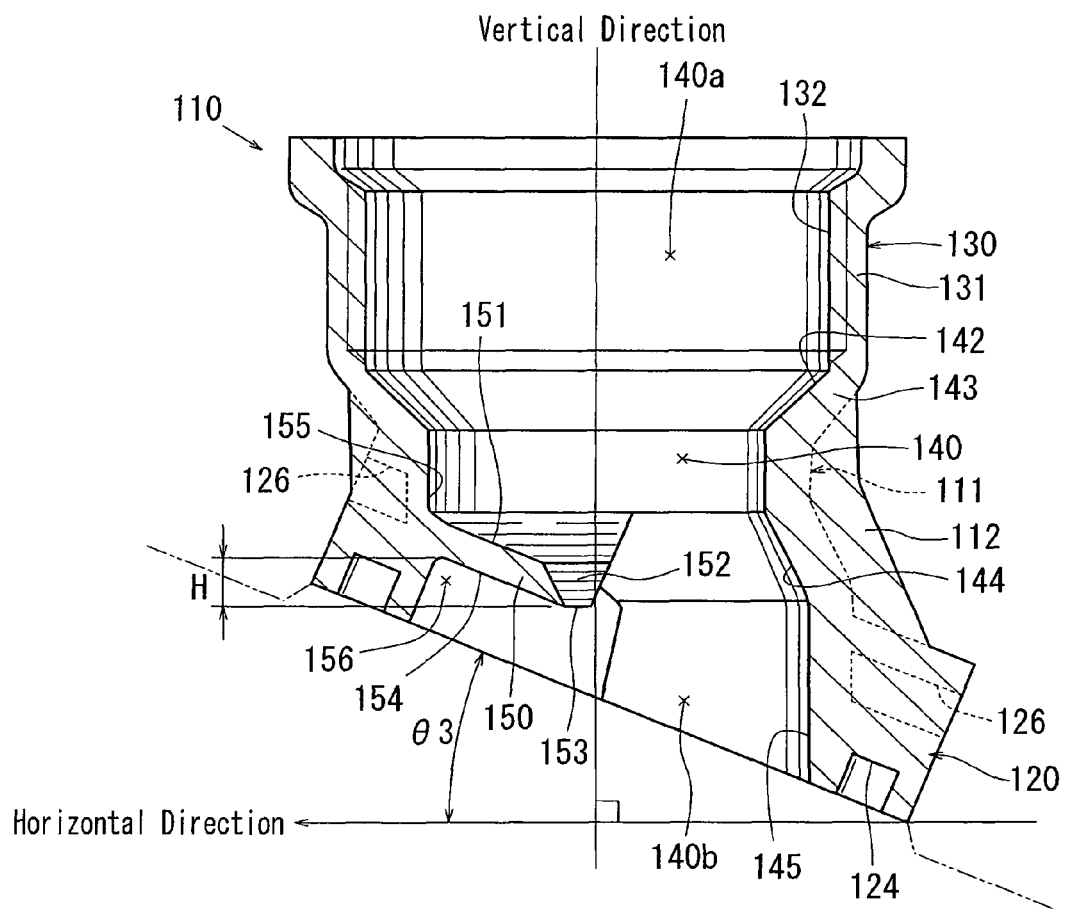
FIG. 10 is a vertical sectional view of the pour connector taken along line X-X of FIG. 9.
Figure 11:
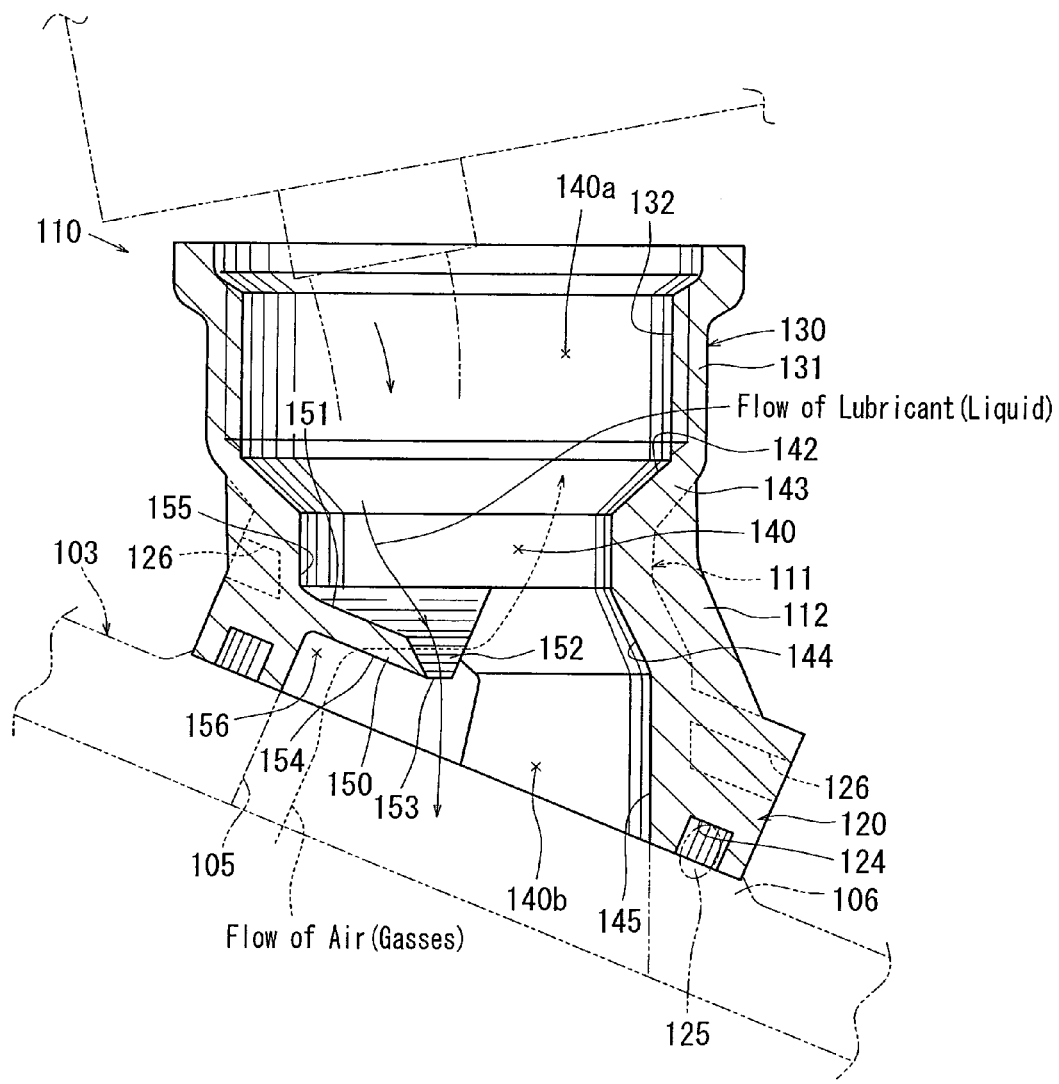
FIG. 11 is an explanatory view, which illustrates flows of a lubricant poured into a pour passage of the pour connector and discharged gases.

FIG. 7 is a schematic perspective view of a pour connector according to the second embodiment of the present invention, which illustrates a condition in which it is connected to a pour port of a cylinder head cover of an engine. FIG. 8 is a front view of the pour connector. FIG. 9 is an overhead plan view of the pour connector. FIG. 10 is a vertical sectional view of the pour connector taken along line X-X of FIG. 9. FIG. 11 is an explanatory view, which illustrates flows of a lubricant poured into a pour passage of the pour connector and discharged gases.

As shown in FIGS. 7 and 8, in the second embodiment, a pour port 105 of a cylinder head cover 103 of an engine 101 is upwardly obliquely opened. Also, a seat portion 106 formed around the pour port 105 is inclined by an angle θ3 with respect to a horizontal line.

On the other hand, as shown in FIGS. 7 to 10, the pour connector 110 is composed of a substantially cylindrically-shaped body portion 111 having a pour passage 140 therein, a lower end connecting portion 120 that is integrally formed in a lower end of the body portion 111 and that can be connected to the pour port 105 of the cylinder head cover 103 while a lower end opening of the pour passage 140 is aligned with the pour port 105, and a cap fitting portion 130 that is integrally formed in an upper end of the body portion 111 and that can be fitted with a cap (not shown) for openably closing an upper end opening of the pour passage 140.

Further, a lower surface of the lower end connecting portion 120 has the same inclination angle as the seat portion 106, so as to be inclined by the angle θ3 with respect to the horizontal line.

As shown in FIGS. 9 and 10, a guide piece 150 is integrally formed in the body portion 111 so as to be positioned between an upper end and a lower end of the pour passage 140 of the body portion 111. The guide piece 150 protrudes from a portion of an inner circumferential wall surface 155 of the pour passage 140 toward the center thereof and has a guide surface 151 formed in an upper surface thereof which surface is directed to the center of the pour passage 140 and is downwardly inclined, so that the pour passage 140 is partially closed by the guide piece 150.

In the second embodiment, the guide piece 150 protrudes from a position of the inner circumferential wall surface 155 of the pour passage 140 over a range of a predetermined angle θ4 (e.g., an angle of approximately 180 to 220 degrees) as shown in FIG. 9. Further, the guide piece 150 that protrudes from the inner circumferential wall surface 155 of the pour passage 140 toward the center thereof may preferably be formed such that its projecting edge 153 does not extend beyond the center of the pour passage 140.

Further, the guide surface 151 formed in the upper surface of the guide piece 150 is defined by a portion of an inner surface of a cone. Further, formed between a portion closer to the projecting edges of the guide surface 151 of the guide piece 150 and the projecting edge 153 is a drop guide surface 152 that is sharply inclined than the guide surface 151. As shown in FIG. 9, the projection edge 153 of the drop guide surface 152 is shaped to a concave arc (an arc centered at the center of the pour passage 140) in a plan view.

Other structures of the second embodiment are the same as the first embodiment.

That is, as shown in FIG. 10, a gas guide portion 156 is formed in a portion of the pour passage 140 in which the guide piece 150 is formed. The gas guide portion 156 is defined by a lower surface 154 of the guide piece 150 and the inner circumferential wall surface 155 of the pour passage 140. Further, when the pour connector 110 is connected to the pour port 105 of the cylinder head cover 103 to use the same, the projection edge 153 of the guide piece 150 is positioned below its base portion on the inner circumferential wall surface 155 of the pour passage 140 by a distance corresponding to a dimension H in the gravitational direction, so that the lubricant (engine oil) poured into the pour passage 140 can flow toward the center while it is guided by the guide surface 151. Conversely, the gas guide portion 156 is positioned above the projection edge 153 of the guide piece 150 in the gravitational direction, so that gases in the cylinder head cover 103 can be discharged from circumferential ends of the gas guide portion 156 upwardly, i.e., in a direction opposite to a pour direction of the lubricant.

As shown in FIG. 10, the lower end connecting portion 120 is formed with a lower tapered hole portion 144 and a lower end hole portion 145 that respectively constitute an outlet port 140b of the pour passage 140 of the body portion 111.

Further, formed in the cap fitting portion 130 is a cap receiving portion 131 that constitutes an inlet port 140a of the pour passage 140 of the body portion 111. Female threads 132 are formed in an inner circumferential wall surface of the cap receiving portion 131, so that male threads formed in the cap (not shown) can be screwed therein.

Moreover, formed between the cap fitting portion 130 and the body portion 111 is an upper tapered cylinder portion 143 having an upper tapered hole portion 142. This upper tapered hole portion 142 is communicated with the cap receiving portion 131 at an upper end thereof and which is gradually reduced toward a lower end thereof and is communicated with the pour passage 140 at the lower end.

Further, as shown in FIGS. 9 and 10, formed in outer circumferential surfaces of the upper tapered cylinder portion 143 and the body portion 111 are a plurality of reinforcing ribs 112 that are circumferentially spaced at predetermined intervals and vertically extend from the upper tapered cylinder portion 143 to the lower end of the body portion 111. Further, recesses 126 are formed in an outer circumferential side surface of the lower end connecting portion 120 in order to prevent formation of bending and shrinking due to uneven thickness during resin molding. Also, the recesses 126 may preferably maintain flatness of the lower surface of the lower end connecting portion 120.

Moreover, as shown in FIG. 11, the lower surface of the lower end connecting portion 120 is formed with an annular groove 124. This annular groove 124 circumferentially extends around the lower end opening of the pour passage 140 and is shaped to receive a seal member 125 (for example, an O-ring formed from elastic materials) therein.

The pour connector 110 of the second embodiment is constructed as described above. Therefore, the second embodiment may substantially have the same functions and effects as the first embodiment.

That is, in the second embodiment, when the lubricant is poured into the upper end opening of the inlet port 140a of the pour passage 140 of the pour connector 110, the lubricant can be guided and smoothly poured while the lubricant is restrained from interfering with the discharged gases from the cylinder head cover 103.

Further, in a condition in which the engine 101 containing the lubricant is operated, when the lubricant in a cylinder head and the cylinder head cover 103 is spattered toward the outlet port 140b of the pour passage 140 of the pour connector 110, the lubricant impinges against the lower surface 154 of the guide piece 150. Therefore, the lubricant cannot be spattered upwardly in the pour passage 140.

In particular, in the second embodiment, the guide piece 150 protrudes from a position of the inner circumferential wall surface 155 of the pour passage 140 over the range of the predetermined angle θ4 (e.g., the angle of approximately 180 to 220 degrees) as shown in FIG. 9. Therefore, the pour passage 140 may have an increased opening area at the portion in which the guide piece 150 exists. As a result, the lubricant can be poured in increased amounts per unit time.

Further, in the second embodiment, a lower surface of the lower end connecting portion 120 has the same inclination angle as the seat portion 106 of the cylinder head cover 103, so as to be inclined by the angle θ3 with respect to the horizontal line. This structure is suitable for a case in which the pour port 105 disposed in a central portion of the seat portion 106 of the cylinder head cover 103 is upwardly obliquely opened. That is, when the pour port 105 of the cylinder head cover 103 is upwardly obliquely opened, the pour connector 110 can be attached thereto while the lower end connecting portion 120 thereof is inclined, so that the upper end opening of the inlet port 140a of the pour passage 140 can be directed upwardly. Therefore, the lubricant can be easily poured.

Third Embodiment

Next, a pour port structure 210 according to a third embodiment of the present invention will be described with reference to FIGS. 12 and 13.

Figure 12:
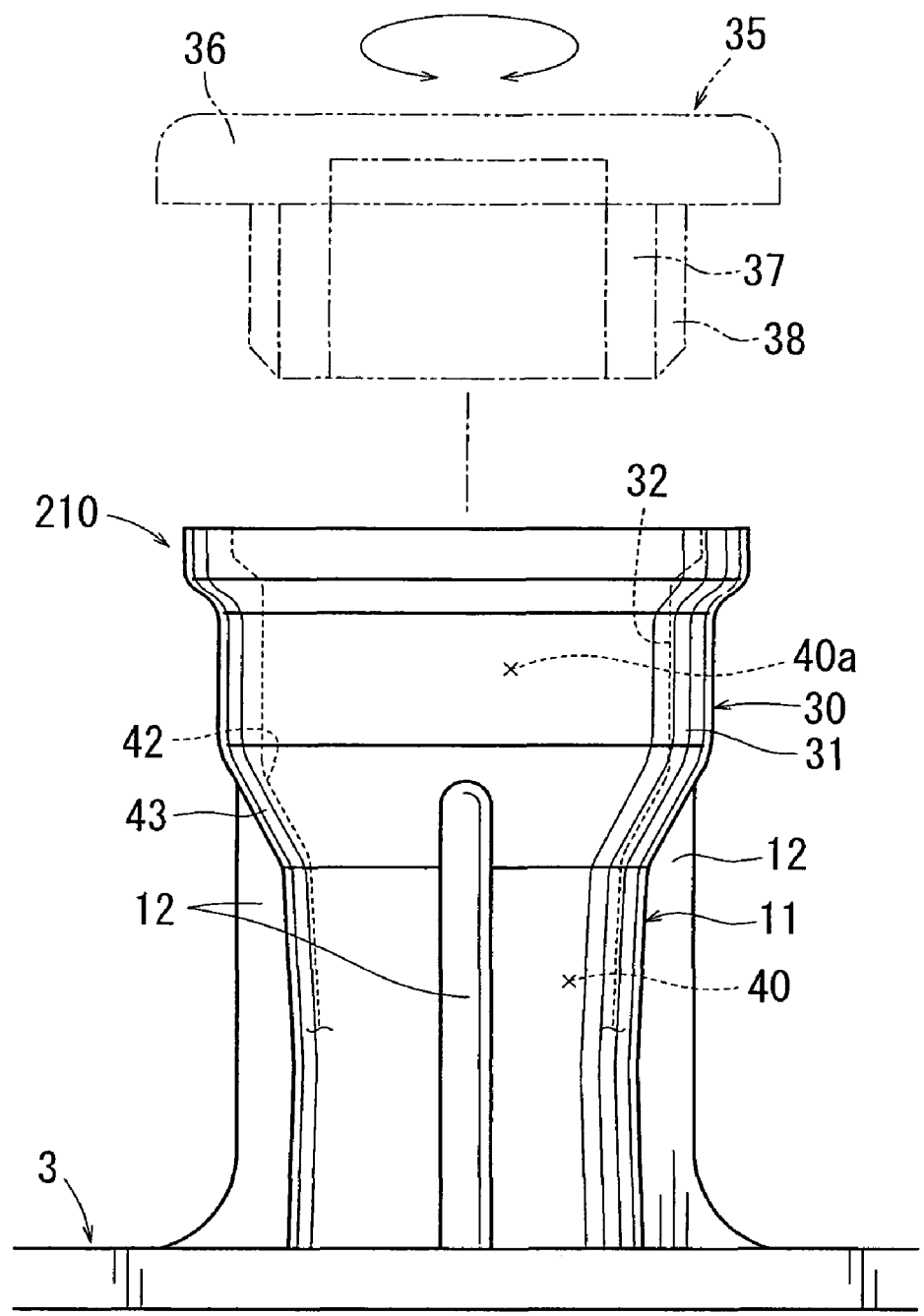
FIG. 12 is a front view of a pour port structure of a cylinder head cover according to a third embodiment of the present invention.

FIG. 12 is a front view of a pour port structure of a cylinder head cover according to the third embodiment of the present invention. FIG. 13 is a vertical sectional view of the pour port structure of the cylinder head cover.

Figure 13:
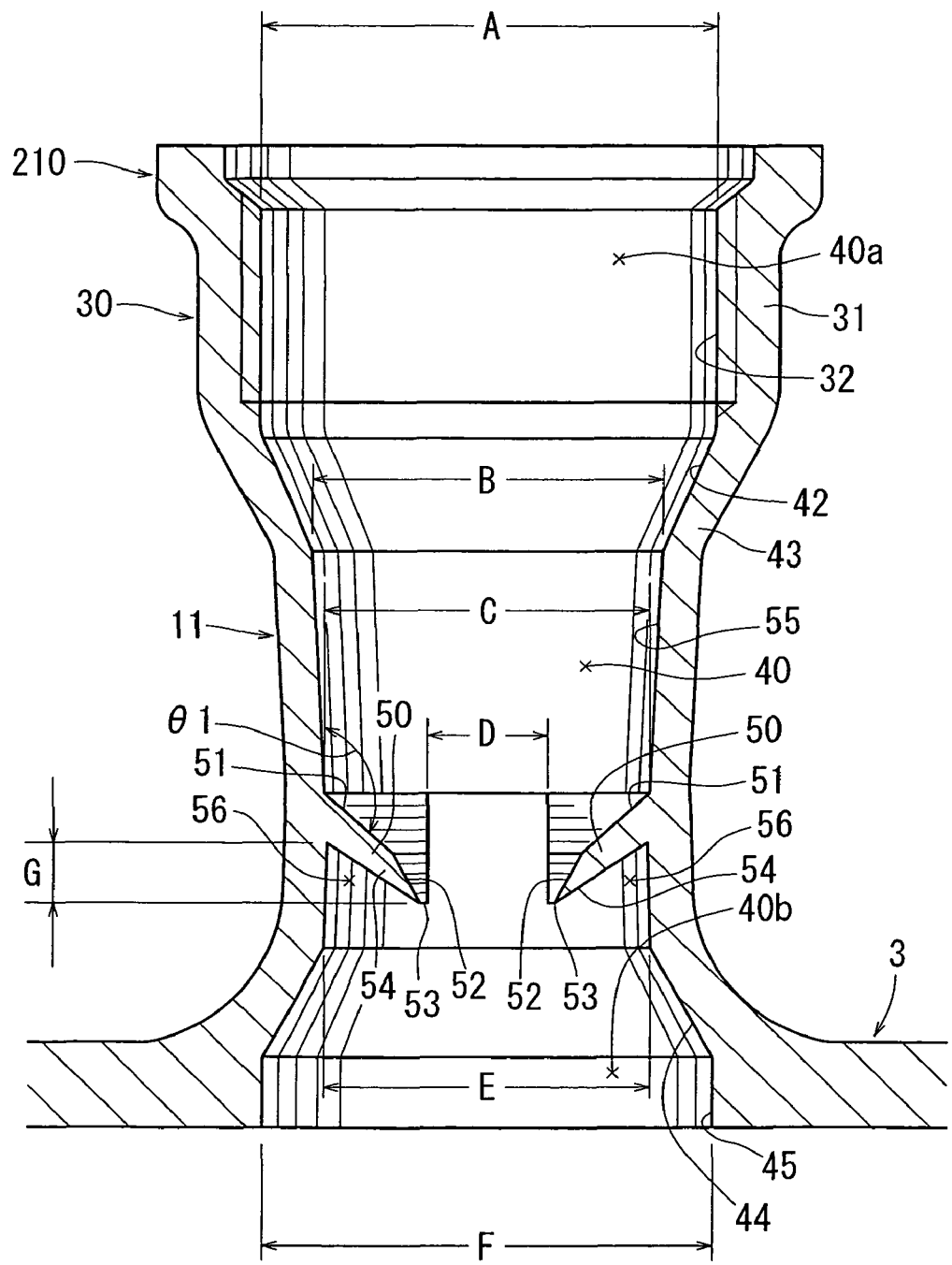
FIG. 13 is a vertical sectional view of the pour port structure of the cylinder head cover.

As shown in FIGS. 12 and 13, in the third embodiment, the cylinder head cover 3 and the body portion of the pour connector of the first embodiment are integrally formed as a unit. That is, the substantially cylindrically-shaped body portion 11 having the pour passage 40 therein is integrally formed (integrally molded) in an upper portion of the cylinder head cover 3.

Because other structures of the third embodiment are the same as the first embodiment, elements that are the same in the first embodiment will be identified by the same reference numerals and a description of such elements may be omitted.

Therefore, in the pour port structure 210 of the third embodiment, when the lubricant is poured into the upper end opening of the pour passage 40, almost all of the lubricant flows toward the center of the pour passage 40 while it is guided by the guide surfaces 51 of the guide pieces 50. Thereafter, the lubricant flows down from the edges of the guide pieces 50 and is then poured into the cylinder head cover 3.

When the lubricant is poured into the cylinder head cover 3, the gases (air) in the cylinder head cover 3 are discharged from the pour passage 40 by an amount corresponding to a pour amount of the lubricant.

At this time, a flow of the discharged gases is directed in a direction opposite to a pour direction of the lubricant. However, since the lubricant does not enter the gas guide portions 56 that are positioned above the edges of the guide pieces 50 in the gravitational direction, the discharged gases flows from the gas guide portions 56 through the base side edges of the guide pieces 50 and the circumferential wall surface of the pour passage 40 without interfering with the lubricant flowing down along the central portion of the pour passage 40, so as to be discharged to the upper end opening of the pour passage 40.

Thus, the lubricant can be guided and smoothly poured while the lubricant is restrained from interfering with the discharged gases from the cylinder head cover 3.

Further, when the lubricant in the cylinder head cover 3 is spattered toward the lower end opening of the pour passage 40, the lubricant impinges against lower sides of the guide pieces 50. Therefore, the lubricant cannot be spattered upwardly in the pour passage 40.

Further, the substantially cylindrically-shaped body portion 11 having the pour passage 40, the guide pieces 50 and the gas guide portions 56 are integrally formed in the upper portion of the cylinder head cover 3. As a result, the number of components and the number of fabrication processes can be reduced.

Fourth Embodiment

Next, a pour connector 310 according to a fourth embodiment of the present invention will be described with reference to FIGS. 14 to 16.

Figure 14:
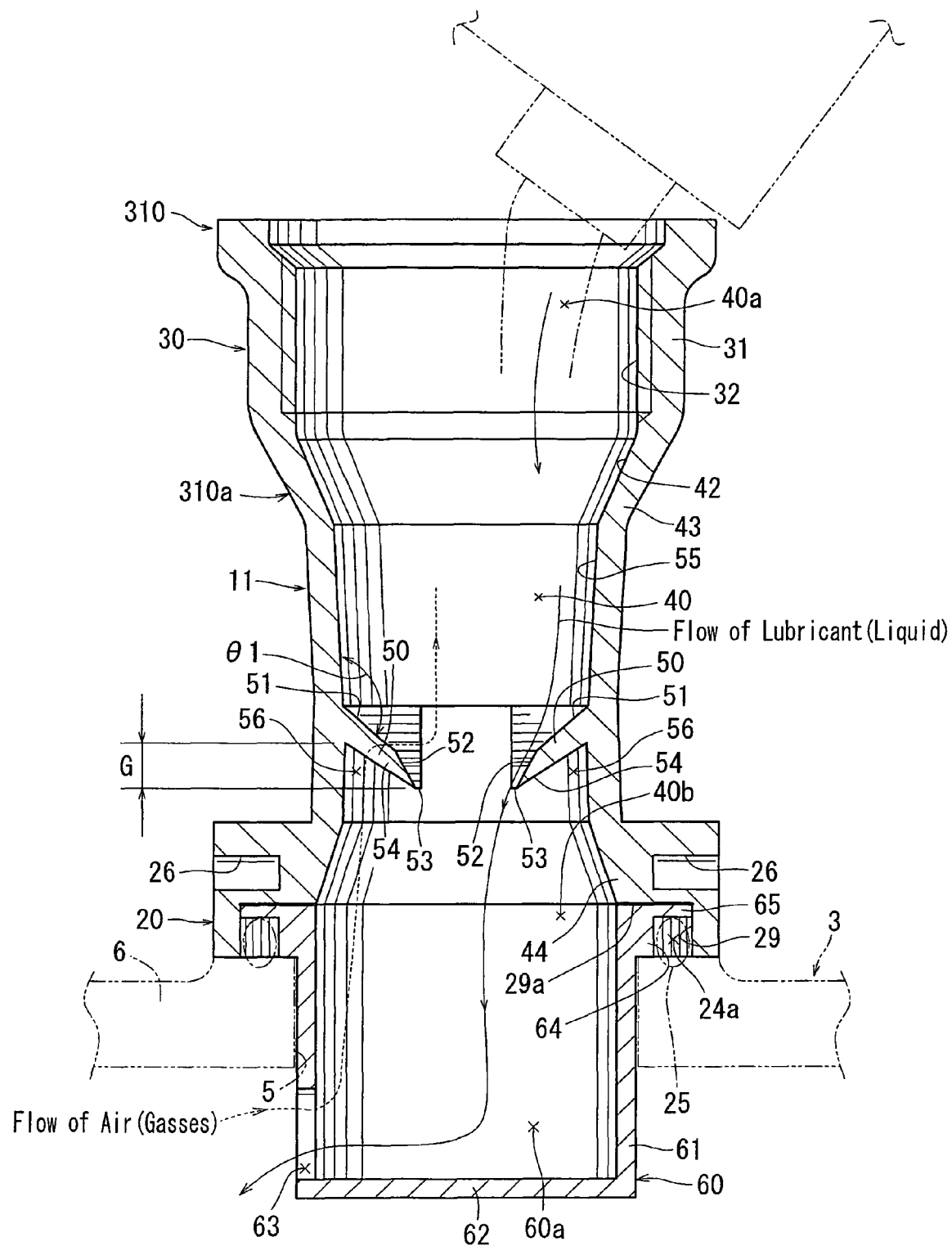
FIG. 14 is a vertical sectional view of a pour connector according to a fourth embodiment of the present invention, which illustrates a condition in which it is connected to a pour port of a cylinder head cover.

FIG. 14 is a vertical sectional view of a pour connector according to a fourth embodiment of the present invention, which illustrates a condition in which it is connected to a pour port of a cylinder head cover. FIG. 15 is a side view of a proximal end guide member. FIG. 16 is a transverse sectional view of the proximal end guide member taken along line XVI-XVI of FIG. 15.

As shown in FIG. 14, in the fourth embodiment, the pour connector 310 is composed of a connector main body 310a and a proximal end guide member 60. The connector main body 310a integrally includes the body portion 11, the lower end connecting portion 20 and the cap fitting portion 30 each of which has the same construction as the first embodiment and is integrally formed by injection molding of thermoplastic synthetic resinous materials. The proximal end guide member 60 is separated from the connector main body 310a and is integrally formed by injection molding of compatible thermoplastic synthetic resinous materials.

That is, in the fourth embodiment, an annular recess 29 having a diameter greater than the outlet port 40b (FIG. 5) of the first embodiment is formed in an inner circumference of a lower end portion of the lower end connecting portion 20 that constitutes the lower end opening (corresponding to the outlet port) of the pour passage 40 of the body portion 11. The proximal end guide member 60 that is capable of preventing the lubricant (liquid) from spattering is coupled to the annular recess 29.

Figure 15:
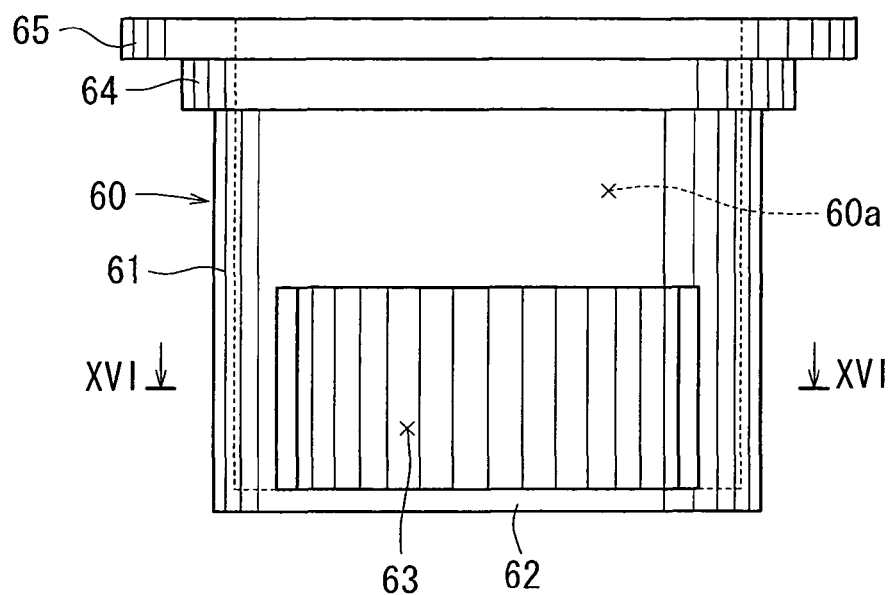
FIG. 15 is a side view of a proximal end guide member.
Figure 16:
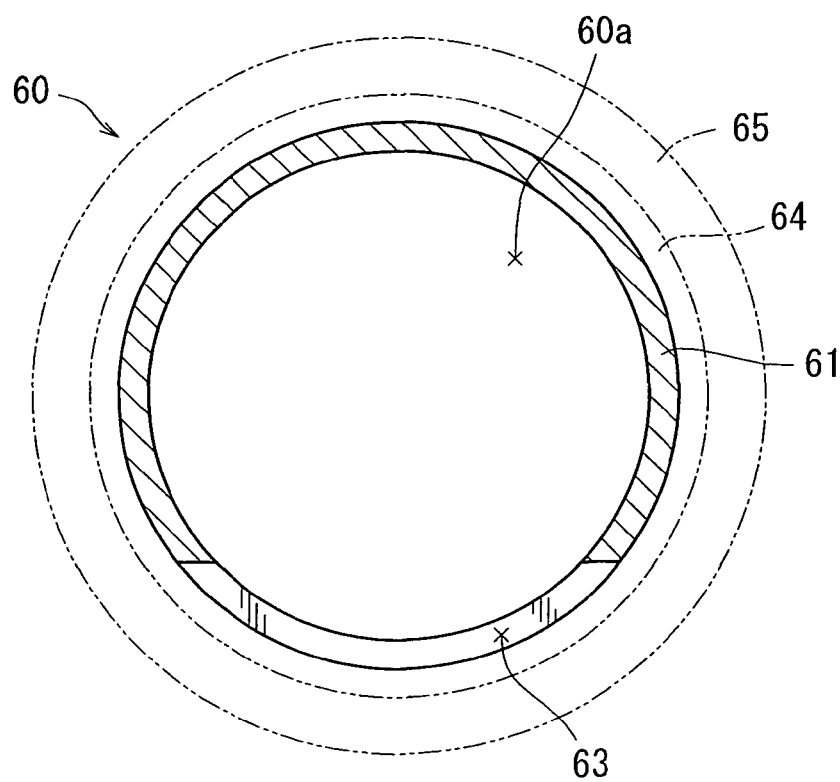
FIG. 16 is a transverse sectional view of the proximal end guide member taken along line XVI-XVI of FIG. 15.

As shown in FIGS. 14 to 16, the proximal end guide member 60 is formed into a bottomed cylindrical shape, so as to have a circumferential wall portion 61 and a bottom wall portion 62 that define an inner space 60a communicated with the lower end opening of the pour passage 40. Further, the circumferential wall portion 61 has an outer diameter that is somewhat smaller than an inner diameter of the pour port 5 of the cylinder head cover 3, so as to be fitted into the pour port 5. Further, formed in the circumferential wall portion 61 is an open hole 63 through which the inner space 60a is communicated with an interior of the cylinder head cover 3.

In the fourth embodiment, as shown in FIGS. 15 and 16, the open hole 63 is formed in substantially a lower half portion of the circumferential wall portion 61 (in a portion between a vertical mid portion and a lower end portion) and is formed so as to have an opening width corresponding to approximately ¼ to ⅓ of an entire circumference of the circumferential wall portion 61.

Further, a closure portion 64 and a flange 65 are integrally formed in an outer circumference of an upper end portion of the circumferential wall portion 61 of the proximal end guide member 60. The closure portion 64 has a diameter greater than the pour port 5 of the cylinder head cover 3 and is shaped to close the pour port 5. The flange 65 is positioned adjacent to an upper end of the closure portion 64 and has a diameter greater than the closure portion 64 and somewhat smaller than the annular recess 29.

The flange 65 of the proximal end guide member 60 is fitted into the annular recess 29 of the lower end connecting portion 20. Subsequently, an upper surface of the flange 65 is integrally bonded to a bottom surface 29a of the annular recess 29 via adhesives, high-frequency fusion-bonding, ultrasonic fusion-bonding or other such means, so as to be fixed thereto.

Further, a lower surface of the lower end connecting portion 20 and a lower surface of the closure portion 64 of the proximal end guide member 60 are shaped so as to flush with each other and to closely contact an upper end surface of the pour port 5 of the cylinder head cover 3 when the flange 65 of the proximal end guide member 60 are integrally connected to the annular recess 29 of the lower end connecting portion 20 (FIG. 14).

Further, in the fourth embodiment, an annular groove 24a is defined by an inner circumferential surface of the annular recess 29 of the lower end connecting portion 20, a lower surface of the flange 65 of the proximal end guide member 60 and an outer circumferential surface of the closure portion 64. Similar to the first embodiment, the seal member (e.g., an O-ring formed of an elastic material) 25 is fitted into the groove 24a, so that the pour connector 310 can be reliably sealed with respect to the pour port 5 of the cylinder head cover 3.

Because other structures of the fourth embodiment are the same as the first embodiment, elements that are the same in the first embodiment will be identified by the same reference numerals and a description of such elements may be omitted.

The pour connector 310 of the fourth embodiment is constructed as described above.

Therefore, in a condition in which the pour connector 310 is connected to the pour port 5 of the cylinder head cover 3 via the lower end connecting portion 20, when the lubricant is poured into the upper end opening of the pour passage 40, almost all of the lubricant flows toward the center of the pour passage 40 while it is guided by the guide surfaces 51 of the guide pieces 50. Thereafter, the lubricant flows down from the edges of the guide pieces 50.

Thereafter, the lubricant flows through the lower end opening of the pour passage 40 into the inner space 60a of the proximal end guide member 60. Further, the lubricant flows along the bottom wall portion 62 of the proximal end guide member 60 and is then poured into the cylinder head cover 3 via the open hole 63 of the circumferential wall portion 61.

Conversely, when the lubricant is poured into the cylinder head cover 3, the gases (air) in the cylinder head cover 3 are introduced into the inner space 60a via the open hole 63 of the proximal end guide member 60 by an amount corresponding to a pour amount of the lubricant, and are then discharged from the pour passage 40 similar to the first embodiment.

As described above, in the fourth embodiment, the lubricant can be guided and smoothly poured while the lubricant is restrained from interfering with the discharged gases from the cylinder head cover 3.

Further, when the lubricant in the engine (including the cylinder head cover 3) is spattered toward the pour connector 310, the spattered lubricant impinges against a lower surface of the bottom wall portion 62 and an outer circumferential surface of the circumferential wall portion 61 of the proximal end guide member 60, so as to be dropped. As a result, the spattered lubricant can be further effectively prevented from entering the pour passage 40 via the inner space 60a of the proximal end guide member 60.

Even if a portion of the spattered lubricant is spattered toward the lower end opening of the pour passage 40 via the inner space 60a of the proximal end guide member 60 through the open hole 63 thereof, the spattered lubricant impinges against the lower sides of the guide pieces 50 in the pour passage 40. Therefore, the lubricant cannot be spattered upwardly in the pour passage 40.

That is, in the fourth embodiment, due to the proximal end guide member 60 disposed at the lower end opening of the pour passage 40 and the guide pieces 50 in the pour passage 40, the lubricant can be doubly prevented from spattering.

Further, in the fourth embodiment, the annular recess 29 is formed in the inner circumference of the lower end portion of the lower end connecting portion 20. In addition, the flange 65 that is integrally bonded to the bottom surface of the annular recess 29 is integrally formed in the outer circumference of the upper end portion of the proximal end guide member 60.

Therefore, the upper surface of the flange 65 of the proximal end guide member 60 can be stably secured to the bottom surface 29a of the annular recess 29 of the lower end connecting portion 20 via adhesives or fusion-bonding.

That is, in the fourth embodiment, the connector main body 310a and the proximal end guide member 60 are respectively formed from the compatible thermoplastic synthetic resinous materials. As a result, the upper surface of the flange 65 of the proximal end guide member 60 can be reliably and firmly bonded and connected to the bottom surface 29a of the annular recess 29 of the lower end connecting portion 20 of the connector main body 310a via adhesives, high-frequency fusion-bonding, ultrasonic fusion-bonding or other such means.

Further, in the fourth embodiment, it is possible to form female threads in the inner circumferential surface of the annular recess 29 of the lower end connecting portion 20 and to form male threads threadably engageable with said female threads in an outer peripheral surface of the flange 65 of the proximal end guide member 60, thereby threadably fixing the flange 65 of the proximal end guide member 60 to the annular recess 29 of the lower end connecting portion 20.

Also, in addition to the fixture means described above, it is also possible to clamp the flange 65 and the closure portion 64 of the proximal end guide member 60 between the bottom surface 29a of the annular recess 29 and the upper end surface of the pour port 5 of the cylinder head cover 3, thereby fixing the flange 65 of the proximal end guide member 60 to the annular recess 29 of the lower end connecting portion 20.

Further, if a fixed condition described above is released, the pour port 5 can be closed by the closure portion 64 that is formed in the outer circumference of the upper end portion of the circumferential wall portion 61 of the proximal end guide member 60 and has a diameter greater than the pour port 5 of the cylinder head cover 3. Therefore, the proximal end cover member 60 can be prevented from falling into the cylinder head cover 3.

Further, in the lower end portion of the lower end connecting portion 20, the annular groove 24a that can receive the seal member 25 therein is defined by the inner circumferential surface of the annular recess 29, the lower surface of the flange 65 of the proximal end guide member 60 and the outer circumferential surface of the closure portion 64. In addition, the seal member 25 can be easily fitted into and retained in the annular groove 24a. Therefore, the lubricant is prevented from leaking from the clearance between the lower end connecting portion 20 of the pour connector 310 and the cylinder head cover 3.

Further, the present invention is not limited to the embodiments described above.

For example, in the present invention, although the pour port 5 (105) of the cylinder head cover 3 (103) is exemplified as the pour port of the liquid container, the present invention can be carried out if the liquid container is a tank, a container or the like that is used to reserve or store a liquid such as water, oil, chemicals and medical solutions.

The invention claimed is:

1. A pour connector that is connected to a pour port of a liquid container so at to pour a liquid into said liquid container, comprising:
   a cylindrically-shaped body portion having a pour passage therein;
   a lower end connecting portion that is integrally formed in a lower end of said body portion and that can be connected to the pour port of said liquid container while a lower end opening of said pour passage is aligned with the pour port; and
   a cap fitting portion that is integrally formed in an upper end of said body portion and that can be fitted with a cap for openably closing an upper end opening of said pour passage,
   wherein at least one guide piece is integrally formed in the body portion so as to be positioned between an upper end and a lower end of the pour passage of said body portion, the at least one guide piece protruding from a portion of an inner circumferential wall surface of said pour passage toward the center thereof and having a guide surface formed in an upper surface thereof, the guide surface being directed to a center of said pour passage and is downwardly inclined, so that said pour passage is partially closed by the at least one guide piece,
   wherein a gas guide portion is formed in a portion of said pour passage in which said at least one guide piece is formed, the gas guide portion being defined by a lower surface of said at least one guide piece and the inner circumferential wall surface of said pour passage, and
   wherein when said pour connector is connected to the pour port of said liquid container to use the same, a projection edge of said at least one guide piece is positioned below a base portion of said at least one guide piece on the inner circumferential wall surface gravitational direction, so that the liquid poured into said pour passage can flow toward the center while it is guided by said guide surface and continue flowing toward the center after it has been guided by said guide surface, whereas said gas guide portion is positioned above the projection edge of said at least one guide piece in the gravitational direction, so that gases in said container can be discharged from circumferential ends of said gas guide portion in a direction opposite to said pour direction.

2. The pour connector for a liquid container as defined in claim 1, wherein the inner circumferential wall surface of the pour passage is formed into a tapered-shape that is gradually enlarged from a boundary defined along the base portion of the at least one guide piece toward the upper end opening and toward the lower end opening.

3. The pour connector for a liquid container as defined in claim 1, wherein the at least one guide piece that protrudes from the inner circumferential wall surface of the pour passage toward the center thereof is formed such that the projecting edge does not extend beyond the center of said pour passage.

4. The pour connector for a liquid container as defined in claim 1, wherein the at least one guide piece comprises a single guide piece that protrudes from a single position of the inner circumferential wall surface of the pour passage.

5. The pour connector for a liquid container as defined in claim 1, wherein the at least one guide piece comprises two guide pieces that protrude from two positions of the inner circumferential wall surface of the pour passage which positions are spaced apart from each other in a circumferential direction thereof and are opposed to each other.

6. The pour connector for a liquid container as defined in claim 1, wherein the guide surface formed in the upper surface of the at least one guide piece is defined by a portion of an inner surface of a cone.

7. The pour connector for a liquid container as defined in claim 1, wherein the projection edge of the at least one guide piece is shaped to a concave arc.

8. The pour connector for a liquid container as defined in claim 1, wherein attachment portions for attaching the pour connector to the liquid container are integrally formed in a plurality of portions of an outer circumference of the lower end connecting portion so as to be radially outwardly projected.

9. The pour connector for a liquid container as defined in claim 1, wherein a lower surface of the lower end connecting portion is formed with an annular groove that circumferentially extends around the lower end opening of the pour passage and is shaped to receive a seal member therein.

10. The pour connector for a liquid container as defined in claim 1, wherein a lower surface of the lower end connecting portion is perpendicular to a center line of the pour passage.

11. The pour connector for a liquid container as defined in claim 1, wherein a lower surface of the lower end connecting portion is inclined with respect to a center line of the pour passage so as to not be perpendicular thereto.

12. The pour connector for a liquid container as defined in claim 1, wherein at least one recess is formed in an outer circumferential side surface of the lower end connecting portion.

13. The pour connector for a liquid container as defined in claim 1, wherein a bottomed-cylindrical shaped proximal end guide member having an inner space communicated with the lower end opening of the pour passage is provided to an inner circumference of a lower end portion of the lower end connecting portion, and
   wherein a circumferential wall portion of the proximal end guide member is formed with an open hole through which the inner space is communicated with an interior of the liquid container.

14. The pour connector for a liquid container as defined in claim 13, wherein an annular recess is formed in an inner circumference of a lower end portion of the lower end connecting portion, and
   wherein a flange that is integrally bonded to a bottom surface of said annular recess is formed in an outer circumference of an upper end portion of the proximal end guide member.

15. The pour connector for a liquid container as defined in claim 1, wherein the liquid container is a cylinder head cover of an engine and a tank.

16. A pour port structure for pouring a lubricant into a cylinder head cover of an engine, comprising:
   a cylindrically-shaped body portion integrally formed in an upper portion of the cylinder head cover and having a pour passage therein; and
   a cap fitting portion that is integrally formed in an upper end of said body portion and that can be fitted with a cap for openably closing an upper end opening of said pour passage,
   wherein at least one guide piece is integrally formed in the body portion so as to be positioned between an upper end and a lower end of the pour passage of said body portion, the at least one guide piece protruding from a portion of an inner circumferential wall surface of said pour passage toward the center thereof and having a guide surface formed in an upper surface thereof, the guide surface being directed to a center of said pour passage and is downwardly inclined, so that said pour passage is partially closed by the at least one guide piece, wherein a gas guide portion is formed in a portion of said pour passage in which said at least one guide piece is formed, the gas guide portion being defined by a lower surface of said at least one guide piece and the inner circumferential wall surface of said pour passage, and wherein a projection edge of said at least one guide piece is positioned below a base portion of said at least one guide piece on the inner circumferential wall surface of said pour passage in the gravitational direction, so that the lubricant poured into said pour passage can flow toward the center while it is guided by said guide surface and continue flowing toward the center after it has been guided by said guide surface, whereas said gas guide portion is positioned above the projection edge of said at least one guide piece in the gravitational direction, so that gases in said cylinder head cover can be discharged from circumferential ends of said gas guide portion in a direction opposite to said pour direction.

* * * * *